United States Patent [19]
Tanaka et al.

[11] Patent Number: 5,973,797
[45] Date of Patent: Oct. 26, 1999

[54] IMAGE READING APPARATUS

[75] Inventors: Katsunari Tanaka; Tomoyuki Yamada; Daisuke Kono; Hiroshi Hayashi; Kazuhiko Minowa; Ken Kajikawa, all of Iwatsuki, Japan

[73] Assignee: Fuji Xerox Co., Ltd., Japan

[21] Appl. No.: 08/779,737

[22] Filed: Jan. 7, 1997

[30] Foreign Application Priority Data

Jan. 8, 1996 [JP] Japan .................................. 8-000980

[51] Int. Cl.⁶ .................................................. H04N 1/04
[52] U.S. Cl. ........................... 358/488; 358/497; 358/449
[58] Field of Search ..................... 358/488, 449, 358/448, 471, 482, 497; 399/370, 376, 389; 382/312

[56] References Cited

U.S. PATENT DOCUMENTS

| 4,994,907 | 2/1991 | Allen | 358/41 |
| 5,568,281 | 10/1996 | Kochis et al. | 358/475 |
| 5,748,341 | 5/1998 | Morikawa | 358/488 |

FOREIGN PATENT DOCUMENTS

| 61-20936 | 1/1986 | Japan . |
| 62-47026 | 10/1987 | Japan . |

*Primary Examiner*—Edward L. Coles
*Assistant Examiner*—Cheukfan Lee
*Attorney, Agent, or Firm*—Fnnegan, Henderson, Farabow, Garrett & Dunner, L.L.P.

[57] ABSTRACT

The present invention relates to an image reading apparatus in which a structure is simple and in which the size of a document can be detected in a short time, wherein the levels of signals, which are outputted from photoelectric elements within a plurality of sensing regions on a light-receiving portion of a line sensor correspond to a pair of nearby regions (#1 and #2, #3 and #4, #5 and #6, and #7 and #8) which hold each edge (e.g., edges 64A, 64B, 64C in FIG. 5) of the plurality of documents of different sizes disposed on a platen glass, are compared to a threshold value, or alternatively, the change in the levels of signals which are outputted from the photoelectric elements within a plurality of sensing regions (e.g., #1, #2 and #3 in FIG. 11) continuously cross each edge of the plurality documents of different sizes is obtained in order to determine the size of the document. An optical sensor which detects the existence of the document at a predetermined position (#0) on the platen glass is provided so that when the document is disposed in a transverse direction (SEF), the documents exists, and when the document is disposed in a longitudinal direction (LEF), the document does not exist. Accordingly, the direction of the document is determined. Due to this structure, the size and direction of the document disposed on the transparent member are determined.

10 Claims, 18 Drawing Sheets

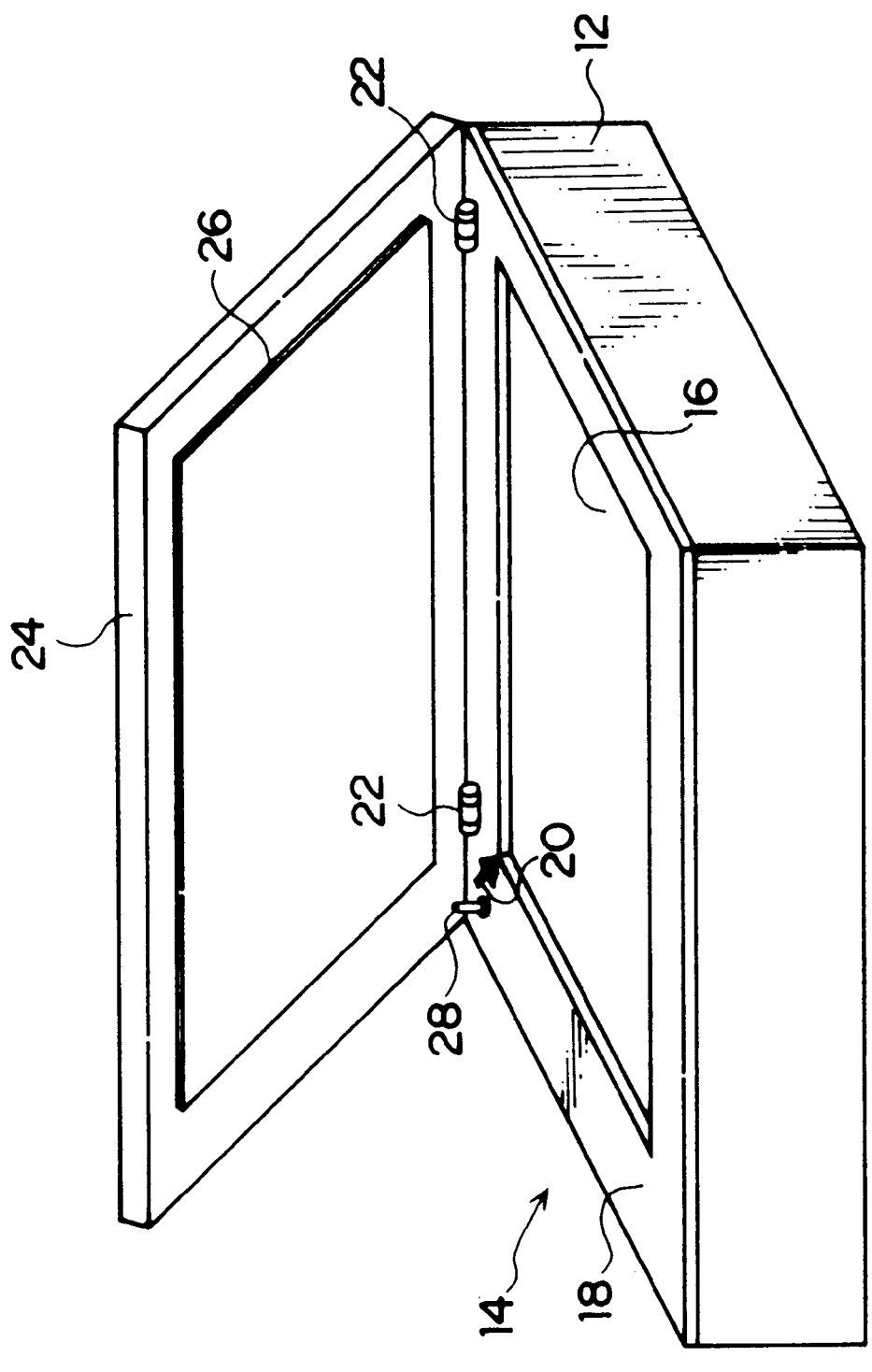

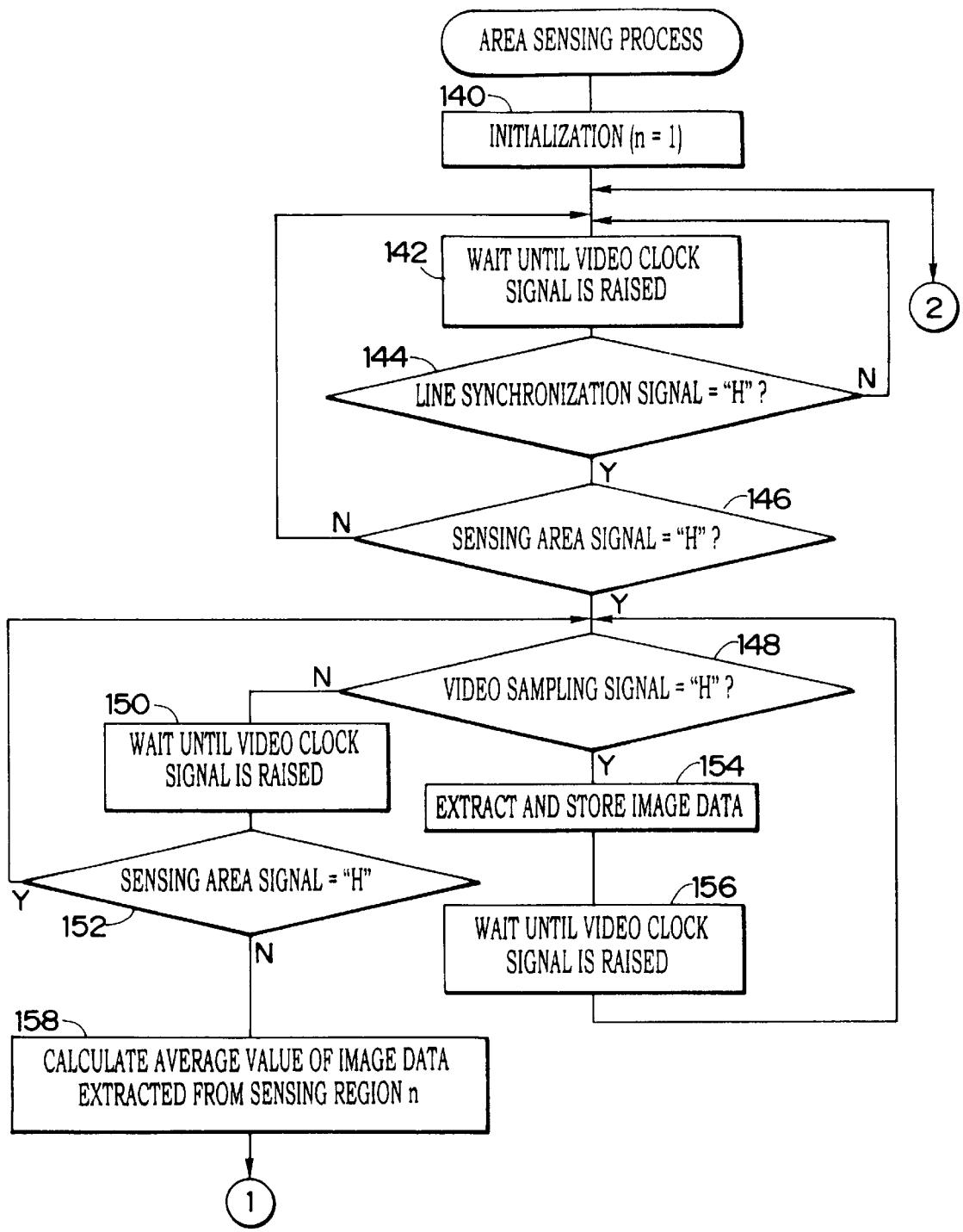
F I G. 9A

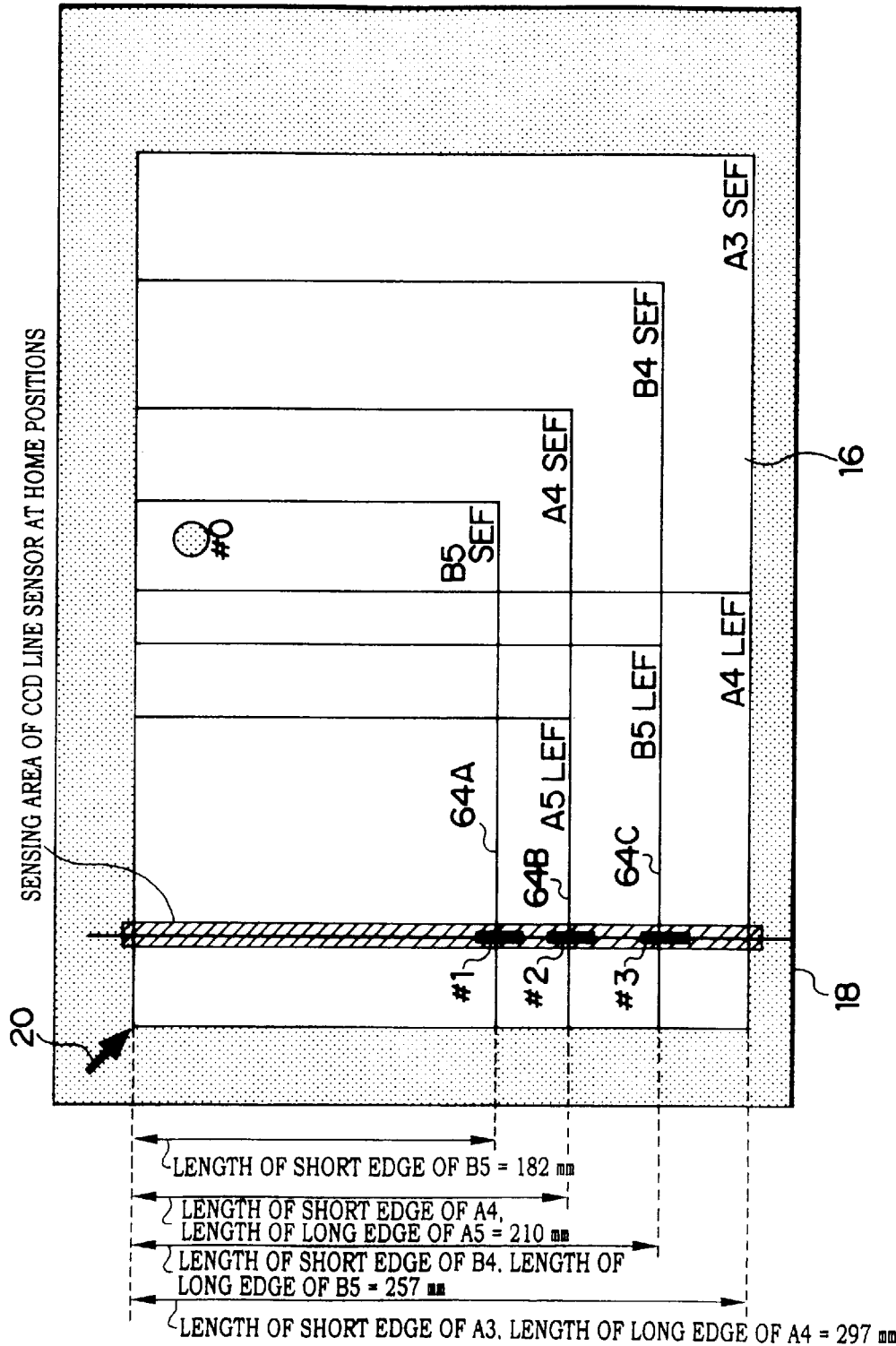

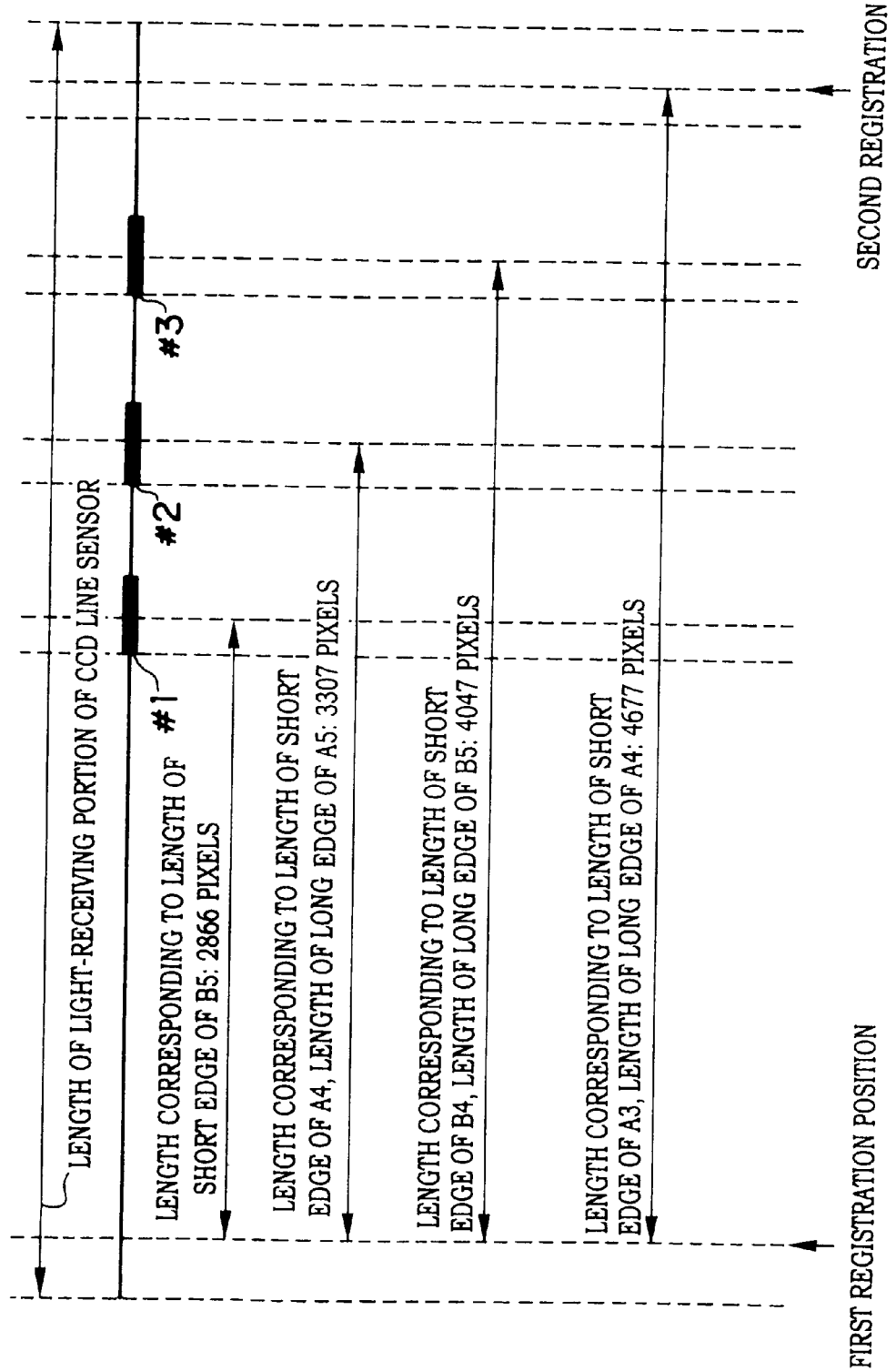

IMAGE READING APPARATUS

BACKGROUND OF THE INVENTION

1. Field of the Invention

The present invention relates to an image reading apparatus, and more particularly, to an image reading apparatus which reads an image recorded onto a document which has been disposed on a plate-shaped transparent member such as a platen glass.

2. Description of the Related Art

Conventionally, regarding a copying machine, a technique has been known in which the size of a document disposed on a platen glass is detected, and on the basis of the detected result, the size of a paper on which an image recorded onto the document is copied, copying magnification or the like are automatically determined. The most common method of detecting the size of a document disposed on a platen glass is disclosed in JP-A No. 61-20936. In this method, one or more optical sensors for detecting the size of the document are provided beneath the platen glass, the optical sensors detect existence of the document at the position where the optical sensors are provided, and on the basis of the detected result by the optical sensors, the size of the document is determined.

However, in the aforementioned size detection method, it is necessary to provide optical sensors at various places beneath the platen glass so as to correspond to documents of various sizes. In reality, since a plurality of optical sensors are needed to cope with the documents of various sizes which can be disposed on the platen glass, there is a drawback in that the structure of the copying machine is complicated.

Further, the method of detecting the size of the document disposed on the platen glass is, more specifically, to detect whether the size of the document is any of the various sizes used as stylized sizes. In the aforementioned method of detection, the positions of the optical sensors are determined in accordance with the various sizes used as stylized sizes.

However, the sizes used as stylized sizes are different depending on the regions. For example, in Japan and in Europe, sizes such as B5, A4, B4 are used as stylized sizes, while in the United States and in Canada, sizes such as letter size, legal size, 11"×17" are used as such. Accordingly, when the size of the document of the stylized size disposed on the platen glass is detected by the aforementioned method of detection, it is necessary to change the positions of a plurality of optical sensors for every region so as to correspond to the different sizes used as stylized sizes.

Moreover, after the image recorded onto the document is converted into a digitized image data, it is general that a copying machine (a so-called digital copying machine), which records (copies) the image onto a paper on the basis of the image data, or a facsimile terminal equipment includes a plurality of photoelectric transducing elements such as CCD which are arranged in a line, and that the photoelectric transducing elements read the image of the document by scanning the document. As a result, in this type of apparatus, it has been more widely used that the document is scanned by the photoelectric transducing elements before the image is read (a so-called pre-scan), and on the basis of the signals outputted from the photoelectric transducing elements, the size of the document is detected.

In the aforementioned method of detection, because the size of the document is also detected by the photoelectric transducing elements provided for reading the image, it is not necessary to provide a plurality of new sensors in accordance with the types of documents disposed on the platen glass. However, because it is necessary to pre-scan the document every time the document is disposed, there is a drawback in that the processing capacity (e.g., the copied number of sheets per unit of time or the like) of the apparatus does not improve.

As it is assumed that the document is disposed on the platen glass, it is general that the size of the document on the platen glass is detected when a platen cover is closed. However, because the reverse surface of the platen cover is normally white, in a case in which the background of the disposed document is white, i.e., the light reflectance of the document is similar to that of the reverse surface of the platen cover, it is difficult to detect optically the size of the document.

As a result, in order to improve reliability of the detection of the size of the document, it has been proposed that a surface whose light reflectance is low is formed on the reverse surface of the platen cover, or that the color of the reverse surface of the platen cover is not white (see JP-B No. 62-47026).

However, if the light reflectance of the reverse surface of the platen cover is remarkably lowered with respect to the light transmittance of the document whose background is white (e.g., the reverse surface of the platen cover is gray, black or a mirror finished surface), though detection of the size of the document becomes easy, the overall density of the background of the copied image becomes high, and a so-called set off occurs. The set off is especially conspicuous in a case in which a recorded image is copied onto a paper, such as a tracing paper, whose thickness is thin and whose light transmittance is relatively high.

Moreover, if the light reflectance of the reverse surface of the platen cover is substantially lowered with respect to the light transmittance of the document whose background is white, when the platen cover is closed and the document is read in the digital copying machine, the portion of the platen glass on which the document is not disposed is recognized as high density (e.g., black). Accordingly, when the image is copied onto the paper simply based on the image data obtained by reading the document, the portion of the copied image which corresponds to the portion at which the document is not disposed becomes solid black. Therefore, it is not preferable.

In order to avoid this, for example, after the pre-scan is effected and the size of the document is detected, the portion of the platen glass on which the document is not disposed is determined on the basis of the detected document size. When the document is read, the signal, which is outputted in accordance with the portion of the platen glass on which the document is not disposed, of the signals outputted from a photoelectric transducer needs to be masked electrically. Alternatively, it is necessary to change automatically input/output characteristic at the time of converting the signals outputted from the photoelectric transducer into the image data so that the density of the portion at which the document is not disposed is 0 (white) on the image data. A drawback arises in that the structure of the apparatus is complicated.

Instead of the above-described method, it has been effected that the reverse surface of the platen cover is a color whose light reflectance is similar to that of white and which is recognized as white by a monochrome copying machine (e.g., yellow). When the document is pre-scanned, an optical filter whose color is complementary to the color of the reverse surface of the platen cover (e.g., dark blue which is complementary to yellow) is inserted before a lens which images the light at the light-receiving portion of the photoelectric transducing element (as a result, the portion of the platen glass on which the document is not disposed is recognized as black), and when the image is read, the above-described optical filter is taken from before the lens. However, in this case, because it is necessary to provide a mechanism for moving the optical filter, there is a drawback in that the structure of the apparatus is complicated after all.

SUMMARY OF THE INVENTION

The present invention was developed with the aforementioned in view, and the object thereof is to obtain an image reading apparatus in which a structure is simple and in which the size of a document can be detected in a short time.

A plurality of documents of different sizes are disposed at substantially fixed positions (e.g., the position at which one of the two edges of the document corresponds to one of the two reference lines which are orthogonal to each other) on a predetermined disposed surface in a fixed direction (the direction which corresponds to the long edge direction of the document). Even if a special case (the case in which a plurality of documents which only one of the length of the long edge and the short edge is different) is considered, at least the position on the predetermined surface, at which one of the remaining two edges of the document is disposed, is different for every size of the document.

On the basis of the above description, the invention according to claim 1 is an image reading apparatus in which a document, which is disposed on a plate-shaped transparent member, is optically scanned by a photoelectric transducer having a plurality of photoelectric transducing elements such that the image which is recorded onto the document is read, comprising: a scanning device which is movable in the direction orthogonal to the photoelectric transducer, the scanning device irradiating light, which is irradiated from a lamp and reflected by reflecting mirrors, to the photoelectric transducer; a size detector which determines the size of the document which is disposed on the transparent member, on the basis of pixel signals outputted from the photoelectric transducing elements within a plurality of small regions which correspond to the area across each specific edge of a plurality of documents of different sizes which are disposed at substantially fixed positions on the transparent member; and a control portion which is connected to the scanning device and the size detector so as to control the scanning device.

The disposition of the document at the substantially fixed position of the transparent member can be easily realized by providing, for example, guide means such as a registration guide for positioning the two edges of the document on fixed positions. In the invention according to claim 1, because the size of the document is determined by using the photoelectric transducers, which are provided for reading the image recorded onto the document, it is not necessary to provide a plurality of sensors for exclusively detecting the size of the document. Therefore, the structure of the apparatus can be simple.

Further, on the basis of the signals outputted from the photoelectric transducing elements within a plurality of small regions which correspond to the area across the specific edge (the edge at which the position on the transparent member is different in accordance with the size of the document) of each of a plurality of documents of different sizes, the size of the document can be determined by, for example, whether the specific edge of the document is positioned in each area. Accordingly, it is not necessary to move (scan) the area on the transparent member at which each of the photoelectric transducing elements of the photoelectric transducer reads, and the size of the document can be determined in a short time.

Moreover, as described in claim 2, when the position of the small region is changeable, even in a case in which the size of the document to be detected is changed (e.g., the case in which the size of the document to be detected as a stylized size is changed), any size of the document can be detected by changing only the position of the small region. There is no need to provide a new photoelectric transducing element or to change the position at which the photoelectric transducing element is arranged.

Even if the document is disposed at the substantially fixed position on the transparent member so that one of the two edges of the document correspond to one of the two reference lines which are orthogonal to each other, the document has two types of directions (the direction in which the long edge of the document runs along a predetermined direction, and the direction in which the long edge thereof runs along the direction which is orthogonal to the above-described predetermined direction). Thus, in a case in which the direction of the document disposed on the transparent member is not fixed, as mentioned before, it is difficult to determine the size of the document by simply detecting the position of the specific edge of the document on the transparent member.

As a result, the invention according to claim 3 is an image reading apparatus in which a document, which is disposed on a plate-shaped transparent member, is optically scanned by a photoelectric transducer having a plurality of photoelectric transducing elements such that the image which is recorded onto the document is read, comprising: a size detector which determines the size of the document which is disposed on the transparent member, on the basis of pixel signals outputted from the photoelectric transducing elements within a plurality of small regions which correspond to the area across each specific edge of a plurality of documents of different sizes which are disposed at substantially fixed positions on the transparent member; and detection means which detects the existence of the document at a predetermined position on the transparent member wherein when the document is disposed on the transparent member in a first direction, the document exists regardless of the size of the document, and when the document is disposed on the transparent member in a second direction which is different from the first position, the document does not exist regardless of the size of the document, wherein on the basis of the signals outputted from the photoelectric transducing elements within the plurality of small regions and the results of detection of existence of the document effected by the detection means, the size and direction of the document disposed on the transparent member are determined.

In the above description, detection means is provided for detecting the existence of document at the predetermined position on the transparent member, in which when the document is disposed on the transparent member in the first direction, the document exists regardless of the size of the document, and when the document is disposed in the second direction which is different from the first position, the document does not exist regardless of the size thereof. Therefore, in a case in which the detection means detects the document (the case in which the document exists), it is determined that the document is disposed on the transparent member in the first direction. In a case in which the detection means does not detect the document (the case in which the document does not exist), it is determined that the document is disposed on the transparent member in the second direction.

As mentioned before, when a plurality of documents of different sizes are disposed at the substantially fixed positions on the transparent member in a fixed direction, except for the aforementioned special case (the case in which a plurality of documents in which only one of the length of the long edge and the short edge of the document is different), the positions of the remaining two edges of the document on the transparent member are different for every size of the document. Accordingly, even if the direction of the document disposed on the transparent member is not fixed, on the basis of the position of the specific edge (one of the two remaining edges) of the document which can be determined based on the signals outputted from the photoelectric transducing elements within a plurality of small regions, and on the basis of the direction of the document on the transparent member which can be determined based on the results of detection of the existence of the document by the detection means, the size of the document disposed on the transparent member can be determined.

The size of the document is determined on the basis of the signals outputted from the photoelectric tranducing elements within a plurality of small regions. More specifically, according to claim 5, at least some of the plurality of small regions are formed by a pair of small regions which correspond to a pair of areas which hold the specific edge of the document of a predetermined size at a predetermined interval, and on the basis of whether the levels of signals outputted from the photoelectric transducing elements within the small regions are greater than or equal to a predetermined value, the position of the edge of the document and the size of the document are determined.

The size of the document is determined on the basis of the signals outputted from the photoelectric tranducing elements within a plurality of small regions. According to claim 7, at least some of the plurality of small regions are formed by small regions which correspond to the area which continuously crosses the specific edge of the document of a predetermined size, and on the basis of the change in the levels of signals outputted from the photoelectric transducing elements within the small regions, the position of the edge of the document and the size of the document are determined.

In the invention according to claim 1, the invention according to claim 9 is an image reading apparatus further comprising: a cover which is movable between a position at which the transparent member is shielded and a position at which the transparent member is exposed, wherein before and after the transparent member is shielded by the cover, the size of the document is determined on the basis of the signals outputted from the photoelectric transducing elements.

In a case in which the image read by the image reading apparatus is used for copying onto a paper, it is general that the cover such as a platen cover is provided so as to be movable between the position at which the transparent member such as a platen glass is shielded and the position at which the transparent member is exposed, and in a state in which the transparent member on which the document is disposed is shielded by the cover, the image which is recorded onto the document is read. In this case, in order to prevent set off to the copied image, it is necessary that the reverse surface of the cover is a low density achromatic color, and more preferably, white.

However, there is a case in which the document whose background is white is disposed on the transparent member and the transparent member is shielded by the cover. Since light reflectance of the document is similar to that of the reverse surface of the cover, it is difficult to detect accurately the position of the edge of the document. The size of the document can be mistakenly detected. Before the transparent member is shielded by the cover, the size thereof can be accurately detected provided that the background of the disposed document is white. However, in a case in which the background of the disposed document is black, it is difficult to detect the size of the document.

In contrast to this, in the invention described in claim 9, before and after the transparent member is shielded by the cover, the size of the document is determined on the basis of the signals outputted from the respective photoelectric transducing elements. Even in a case in which the reverse surface of the cover (the surface which opposes the transparent member) is a low density achromatic color (e.g., white), regardless of the color of the background of the document which is disposed on the transparent member, the size of the document can be accurately detected.

BRIEF DESCRIPTION OF THE DRAWINGS

FIG. 1 is a perspective view showing an appearance of an image reading apparatus relating to a present embodiment.

FIG. 2B is a side view of the image reading apparatus showing a state in which the platen cover is rotated more than a predetermined angle from the stood-up state and in which an angle sensor is turned on.

FIGS. 9A and 9B are flowcharts for describing an area sensing process which is effected at the size detection portion relating to the first embodiment.

FIG. 11 is a plan view showing a sensing area on a platen glass relating to a second embodiment.

FIG. 12 is a conceptual view showing a sensing region when the size of a document, which has been set on a light-receiving portion of a CCD line sensor relating to the second embodiment, is detected.

DESCRIPTION OF THE PREFERRED EMBODIMENTS

Figure 2A:
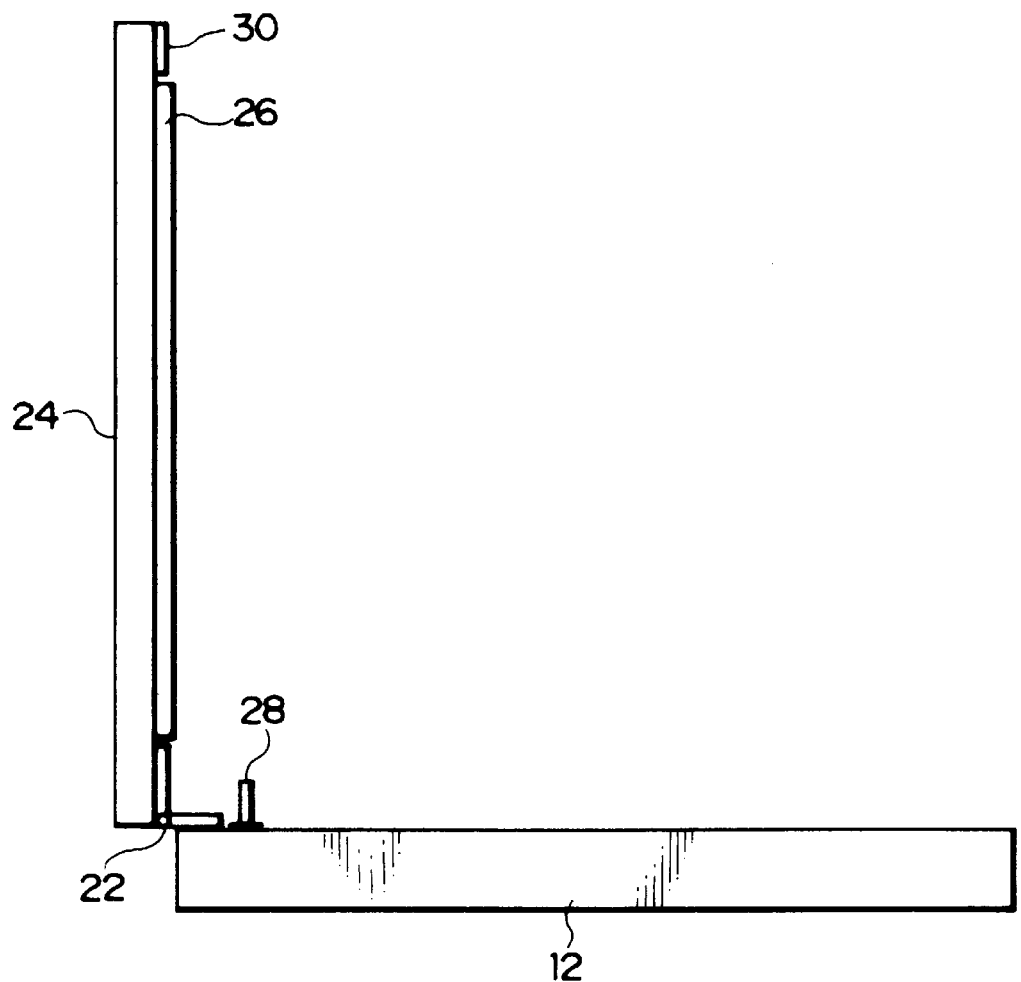
FIG. 2A is a side view of the image reading apparatus showing a state in which a platen cover is stood up.

An example of embodiments of the present invention will be described in detail hereinafter with reference to the drawings.

First Embodiment

FIG. 1 shows an appearance of a image reading apparatus 10 relating to the first embodiment. The image reading apparatus 10 includes a box-shaped cabinet 12. A lid-shaped document stand 14 which closes an upper open portion of the cabinet 12 is mounted to the upper portion of the cabinet 12. The document stand 14 includes a rectangular, plate-shaped platen glass 16 which is a transparent member and a rectangular, frame-shaped registration guide plate 18 which is provided at the outer circumference of the platen glass 16. In the first embodiment, the size of the portion of the platen glass 16 which is exposed from the registration guide plate 18 is substantially equal to A3 size.

Figure 3:
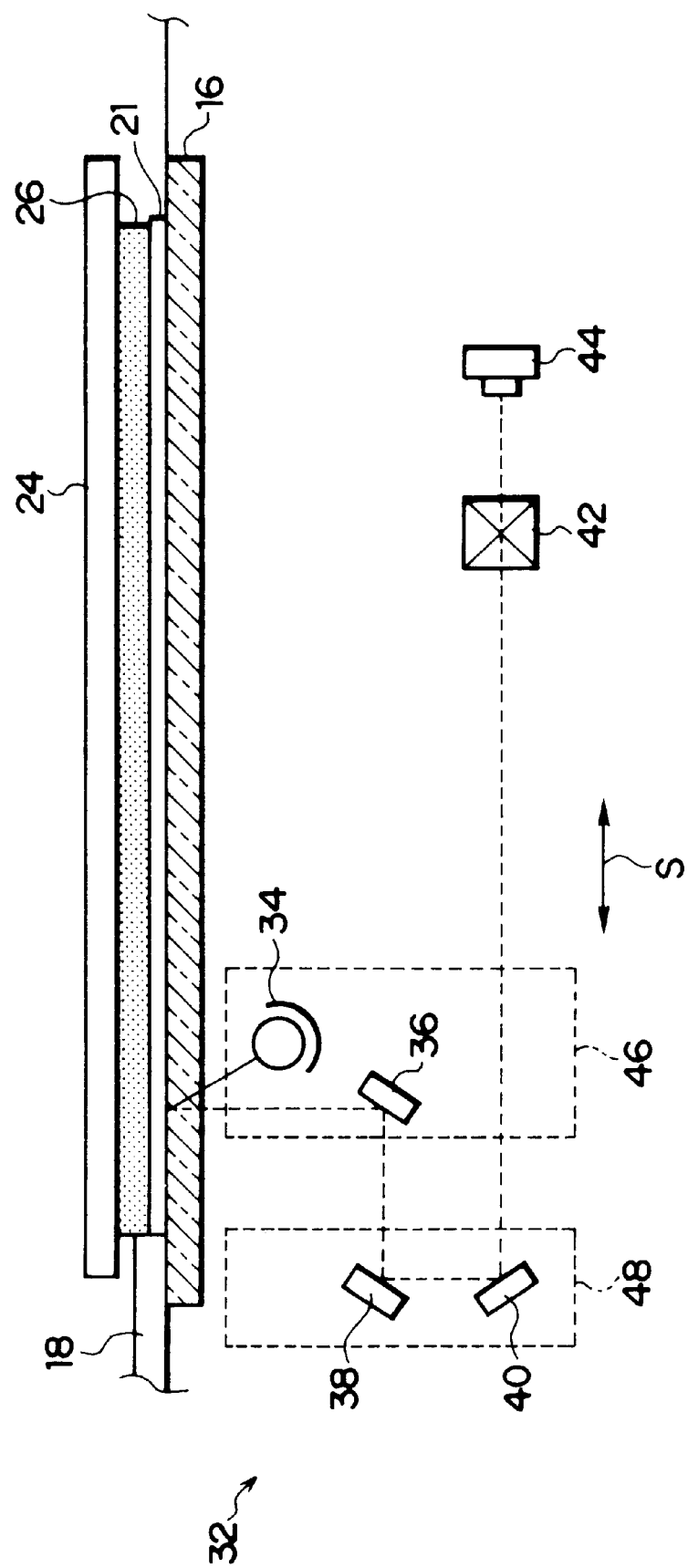
FIG. 3 is a cross-sectional view showing a schematic structure of an optical system which is provided at a body of equipment of the image reading apparatus.

As illustrated in FIG. 3, the position of the upper surface of the registration guide plate 18 is higher than that of the platen glass 16. A document registration mark 20 is applied to the position which corresponds to a left and back side corner of the platen glass 16 shown in FIG. 1. A document is disposed on the platen glass 16 such that the surface onto which an image is recorded faces the platen glass 16 side, one of the four corner portions of the document corresponds to the corner portion of the platen glass 16 which is positioned at the location where the document registration mark 20 is applied, and two edges of the document abut the inner surfaces of the registration guide plate 18 (see a document 21 in FIG. 3). Accordingly, regardless of the size of the document, the document is disposed at a substantially fixed position on the platen glass 16.

A platen cover 24 (corresponding to the cover of the present invention) is mounted to one long edge side of the cabinet 12 via a pair of hinges 22. The platen cover 24 is pivotable between the stood-up position (an open position) shown in FIG. 2A and the position which is unillustrated and at which the document stand 14 is completely closed (a closed position). A rectangular platen cushion 26 is stuck to the reverse surface side of the platen cover 24 (an opposing surface side of the platen glass 16). The surface of the platen cushion 26 which opposes the platen glass 16 is white.

Figure 2B:
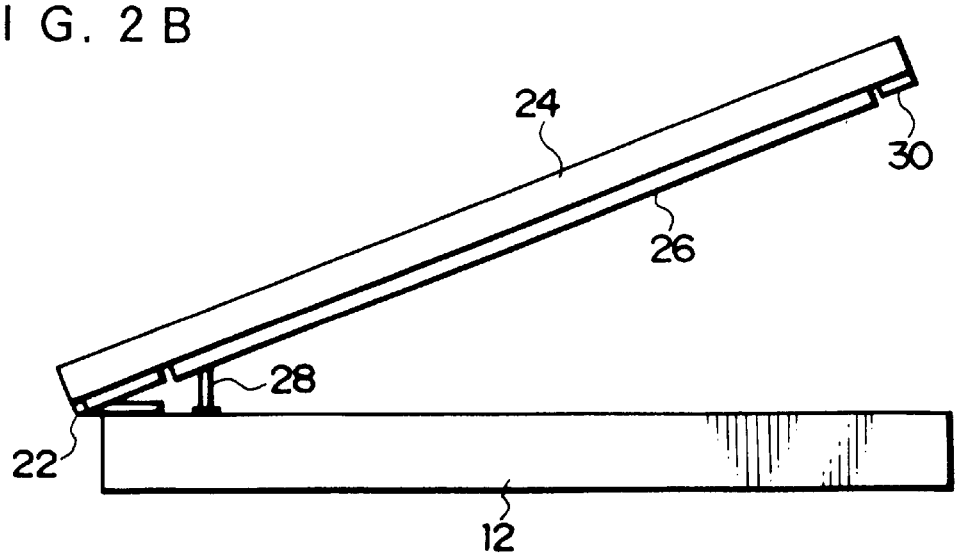

In a vicinity of the position at which one of the hinges 22 is provided, an angle sensor 28, which is formed by an on/off switch and is provided so that a moving element projects from the document stand 14, is mounted. FIGS. 1, 2A and 2B show only the moving element of the angle sensor 28. The moving element of the angle sensor 28 is movable along the longitudinal direction and is held at the positions shown in FIGS. 1 and 2A by an unillustrated urging means such as a spring. Here, the angle sensor 28 is turned off. When the platen cover 24 is rotated from the open position shown in FIG. 2A to the closed position more than a predetermined angle, as illustrated in FIG. 2B, the moving element of the angle sensor 28 abuts the reverse surface of the platen cover 24 so as to be pressed. Consequently, before the platen cover 24 is rotated to the closed position (the state shown in FIG. 2B), the angle sensor 28 is turned on.

Further, as shown in FIGS. 2A and 2B, on the reverse surface of the platen cover 24, a platen interlock sensor 30 is mounted to an end portion which is opposite to the end portion of the side at which the hinge 22 is mounted. In a case in which the platen cover 24 is not closed, the platen interlock sensor 30 is turned off. In a case in which the platen cover 24 is closed, the platen interlock sensor 30 is turned on.

As illustrated in FIG. 3, a scanning device 32 is provided within the cabinet 12. The scanning device 32 includes a lamp 34 which irradiates light toward the platen glass 16, a first reflecting mirror 36 which reflects reflected light from the platen glass 16 side substantially horizontally, a second reflecting mirror 38 which is disposed at the light irradiating side of the first reflecting mirror 36 and which irradiates the light which is incident from the first reflecting mirror 36 downwardly along the substantially vertical direction, and a third reflecting mirror 40 which is disposed at the light irradiating side of the second reflecting mirror 38 and which reflects the light which is incident from the second reflecting mirror 38 substantially horizontally. Additionally, at the light irradiating side of the third reflecting mirror 40, an imaging lens and a CCD line sensor 44 serving as a photoelectric transducer of the present invention are provided.

FIG. 3 shows a cross-sectional view of the platen glass 16 along a long edge direction thereof. The lamp 34, the reflecting mirrors 36, 38, 40, and the imaging lens 42 are respectively provided from one end of the platen glass 16 to the other end thereof along a short edge direction thereof (the direction normal to the page surface of FIG. 3: hereinafter, "main scanning direction"). Accordingly, the light, which is irradiated from the lamp 34 to the platen glass 16, and the light, which is reflected by the platen glass 16 side so as to be imaged on the light-receiving portion of the CCD line sensor 44 via the reflecting mirrors 36, 38, 40 and the imaging lens 42, respectively forms a slit-shaped light which is long in the main scanning direction.

The CCD line sensor 44 includes a plurality of cells (photoelectric transducing elements of the present invention) which are arranged at fixed density along the main scanning direction. The amount of light received at each of the position on the light-receiving portion of the CCD line sensor 44 along the main scanning direction is converted into an electric signal by the cell so as to be outputted.

Moreover, the lamp 34 and the first reflecting mirror 36 are mounted to a carriage member 46 which can move reciprocally within the cabinet 12 along a sub-scanning direction (the direction of arrow S in FIG. 3) which is orthogonal to the main scanning direction. The second reflecting mirror 38 and the third reflecting mirror 40 are mounted to a carriage member 48 which can move reciprocally within the cabinet 12 along the same sub-scanning direction. The carriage member 46 is moved along the sub-scanning direction by a carriage member driving portion 50 (see FIG. 4), and the carriage member 48 is moved along the sub-scanning direction by a carriage member driving portion 52 (see FIG. 4). The carriage member driving portions 50, 52 are connected to a control portion 54 so that operations of the carriage member driving portions 50, 52 are controlled by the control portion 54. The control portion 54 includes a microcomputer and the like.

In a case in which the image of the document disposed on the platen glass 16 is read, due to the control portion 54, the carriage member 46 is moved at predetermined velocity along the sub-scanning direction by the carriage member driving portion 50, and the carriage member 48 is moved at half of the above-described predetermined velocity along the direction which is the same as the moving direction of the carriage member 46 by the carriage member driving portion 52. In a case in which the platen cover 24 is closed, the light irradiated from the lamp 34 is reflected by the document 21 which is disposed on the platen glass 16 or by the surface of the platen cushion 26 which is in close contact with the platen glass 16. Consequently, as the carriage members 46, 48 are moved as described above, regardless of the position of the carriage member 46 along the sub-scanning direction, an optical path length from the lamp 34 to the CCD line sensor 44 is constant.

Figure 4:
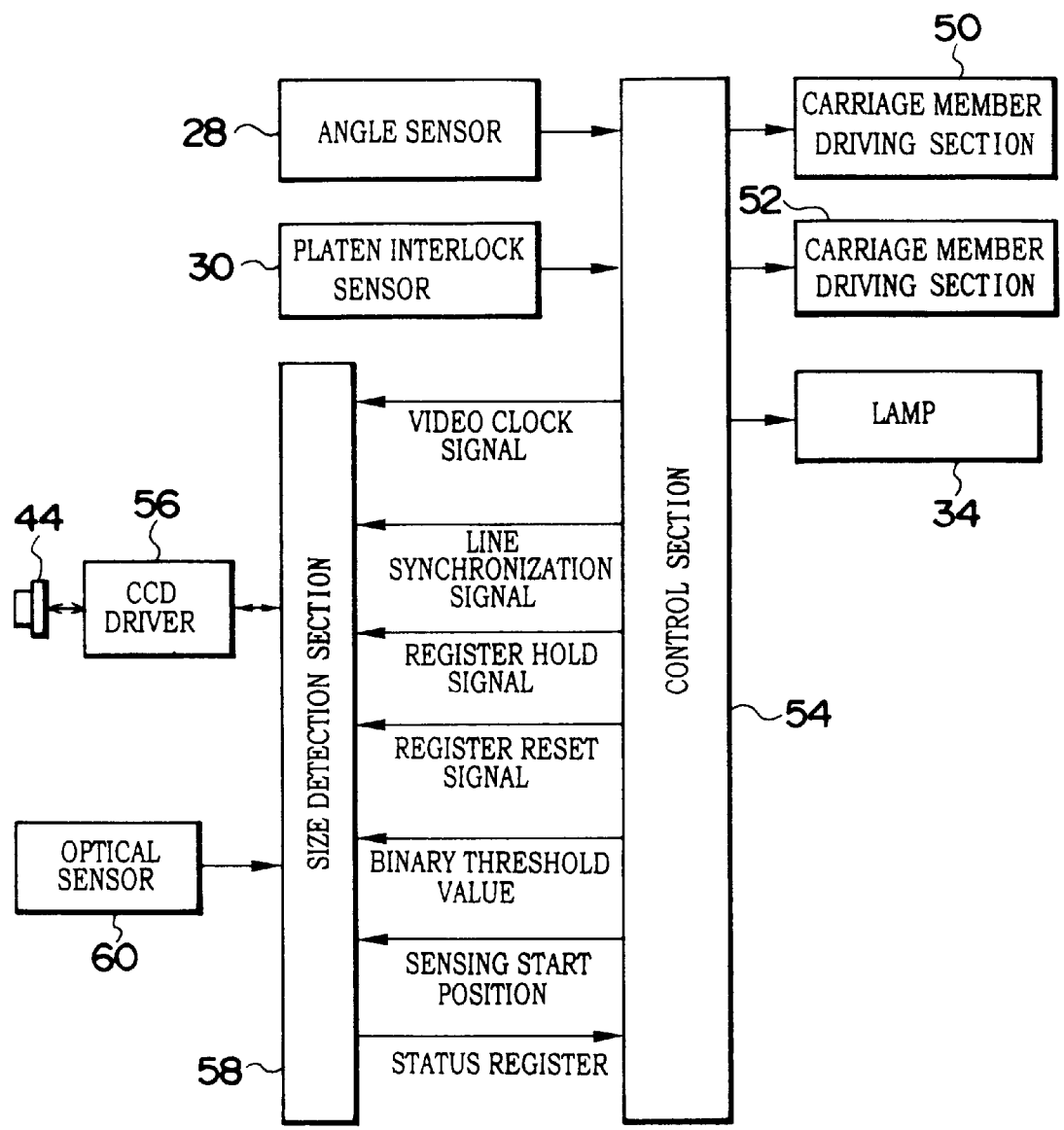
FIG. 4 is a schematic block diagram showing a control portion and its peripheral structures of the image reading apparatus.

As shown in FIG. 4, the angle sensor 28 and the platen interlock sensor 30 are connected to the control portion 54, and the results detected by the sensors 28, 30 are inputted to the control portion 54. Further, the lamp 34 is connected to the control portion 54 so that on/off of the lamp 34 is controlled by the control portion 54. Moreover, the CCD line sensor 44 is connected to the control portion 54 via a CCD driver 56 and a size detection portion 58.

Data and various signals including a video clock signal and a synchronization signal such as a line synchronization signal are inputted from the control portion 54 to the size detection portion 58 (the contents of signals and data will be described later). The video clock signal which has been inputted to the size detection portion 58 is inputted to the CCD line sensor 44 via the CCD driver 56. The CCD line sensor 44 operates at a timing synchronized with the video clock signal, and the signals indicating the amounts of light received by the respective cells are successively outputted at the timing synchronized with the video clock signal. The signals outputted from the CCD line sensor 44 are amplified by the CCD driver 56, converted into the digitized image data and outputted to the size detection portion 58.

Figure 5:
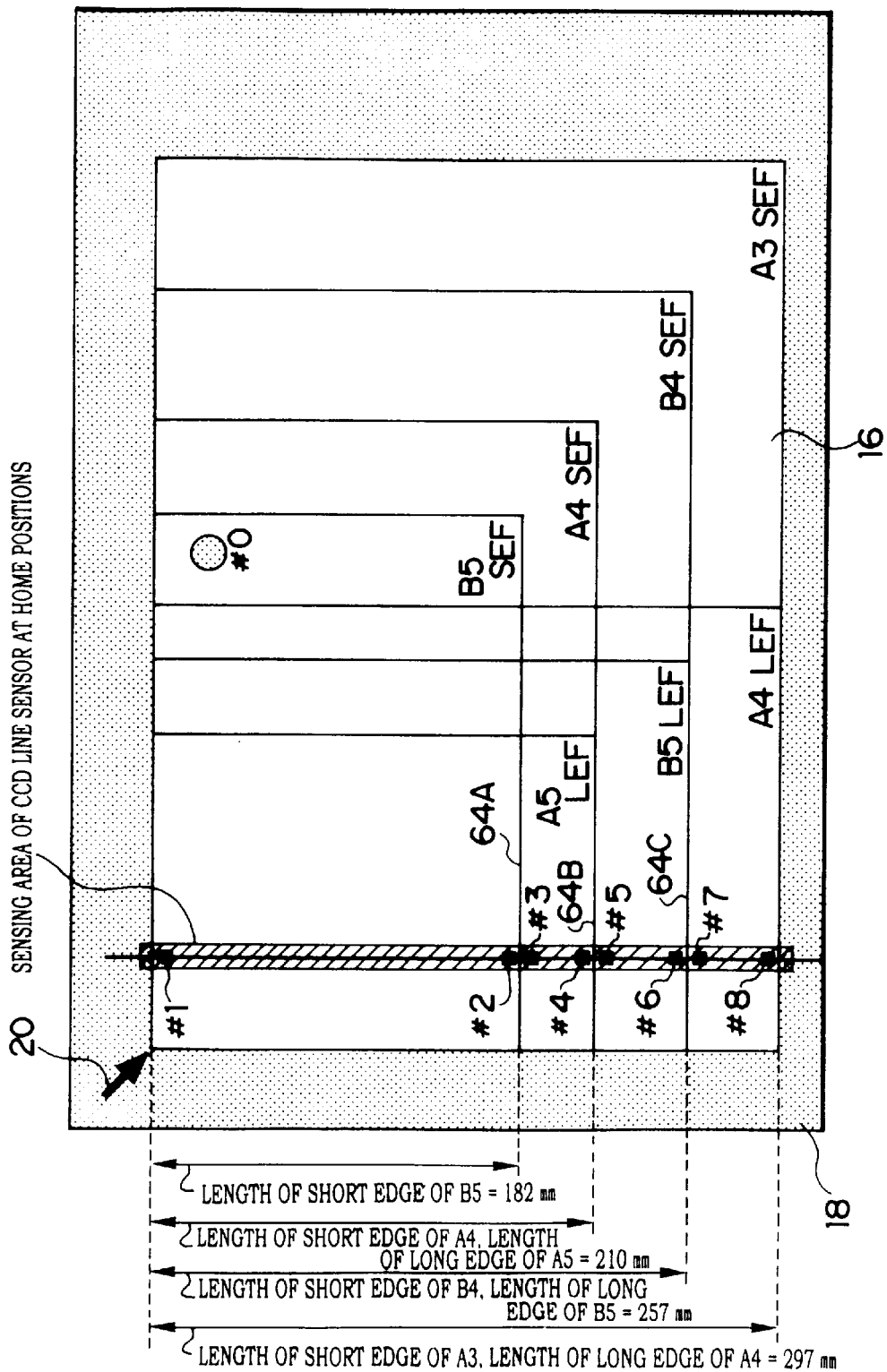
FIG. 5 is a plan view showing a sensing area on the platen glass relating to a first embodiment.

A optical sensor 60 for detecting the direction of a document is connected to the size detection portion 58. The optical sensor 60 corresponds to detection means of the present invention, and is provided beneath the platen glass 16. As illustrated in FIG. 5, the optical sensor 60 is provided at the position at which the existence of the document can be detected. Namely, at a predetermined position (the position shown as "#0"in FIG. 5), in a case in which a document is disposed on the platen glass 16 in a transverse direction thereof (the direction in which the long edge direction of the document corresponds to the longitudinal direction of the platen glass 16: SEF), the document exists regardless of the size thereof (B5, A4, B4, A3 or the like). In a case in which a document is disposed on the platen glass 16 in a longitudinal direction thereof (the direction in which the long edge direction of the document corresponds to the short edge direction of the platen glass 16: LEF), the document does not exist regardless of the size thereof.

The aforementioned image reading apparatus 10 forms a part of a digital copying machine (unillustrated). The image of a document read by the image reading apparatus 10 is copied onto a paper by the copying machine. The size and direction of the document determined by the image reading apparatus 10 (determination of the size and direction of the document will be described in detail later) are used for selecting a paper or for determining copying magnification.

Next, the operation of the first embodiment will be explained. In a standby state in which the document has not been read or the like (which includes the time during which the size of the document is determined), the control portion 54 controls the positions (so-called home positions) of the carriage members 46, 48 so that the sensing area of the CCD line sensor 44 is about 20 mm inwardly of the borderline region between the registration guide plate 18 and the platen glass 16 along the sub-scanning direction (the hatched area shown in FIG. 5). It is clear from FIG. 5 that the length of the sensing area of the CCD line sensor 44 along the main scanning direction is slightly longer than the length of the platen glass 16 along the main scanning direction.

In the first embodiment, eight sensing areas denoted by #1 through #8 in FIG. 5 are determined as the sensing area of the CCD line sensor 44 which is used when the size of the document is determined. As illustrated in FIG. 5, when the documents of various sizes are disposed on the platen glass 16 in the longitudinal direction thereof or the transverse direction thereof, the positions of the respective sensing areas are determined by considering the position of the specific edge of the document, on the platen glass 16, which crosses the sensing area of the CCD line sensor 44.

Namely, in a case in which the document of B5 size is disposed on the platen glass 16 in the transverse direction thereof, the positions of the sensing areas #2 and #3 are determined at a predetermined interval so as to hold the specific edge (the edge 64A in FIG. 5) of the document which crosses the sensing area of the CCD line sensor 44. Moreover, in a case in which the document of A4 size is disposed on the platen glass 16 in the transverse direction thereof and in a case in which the document of A5 size is disposed on the platen glass 16 in the longitudinal direction thereof, the positions of the sensing areas #4 and #5 are determined at a predetermined interval so as to hold the specific edge (the edge 64B in FIG. 5) of the document which crosses the sensing area of the CCD line sensor 44.

Further, in a case in which the document of B4 size is disposed on the platen glass 16 in the transverse direction thereof and in a case in which the document of B5 size is disposed on the platen glass 16 in the longitudinal direction thereof, the positions of the sensing areas #6 and #7 are determined at a predetermined interval so as to hold the specific edge (the edge 64C in FIG. 5) of the document which crosses the sensing area of the CCD line sensor 44. In a case in which the document of A3 size is disposed on the platen glass 16 in the transverse direction thereof, the positions of the sensing areas #1 and #8 are determined so as to be positioned slightly inwardly of the two long edges of the document which cross the sensing area of the CCD line sensor 44 (slightly inwardly of the positions at which the end portions of the registration guide plate 18 cross the vicinity of the opposite end portions of the sensing area of the CCD line sensor 44).

Hereinafter, among the positions at which the sensing area of the CCD line sensor 44 intersects the end portions of the registration guide plate 18, the position in the vicinity of the sensing area #1 will be referred to as a first registration position and the position in the vicinity of the sensing area #8 will be referred to as a second registration position (see also FIG. 6).

Figure 6:
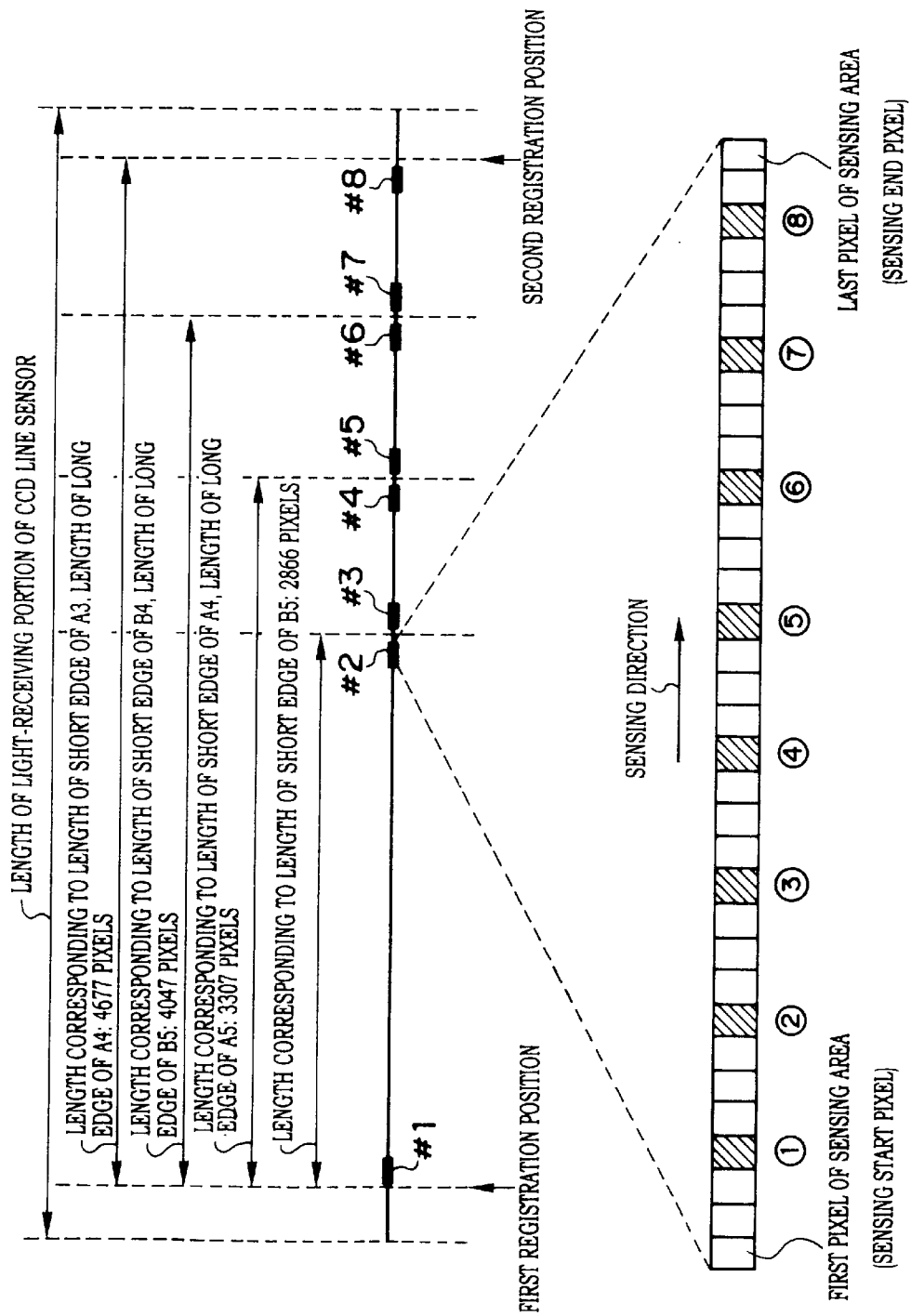
FIG. 6 is a conceptual view showing a sensing region when the size of a document, which has been set on a light-receiving portion of a CCD line sensor relating to the first embodiment, is detected.

FIG. 6 shows conceptually a light-receiving portion of the CCD line sensor 44. In the first embodiment, sensing regions #1 through #8 (a plurality of small regions in the present invention, more particularly, the regions which correspond to the small regions described in claim 5) are determined in advance on the light-receiving portion of the CCD line sensor 44 so as to correspond to the sensing areas #1 through #8 in FIG. 5. The sensing regions #1 through #8 are formed by a plurality of pixels (=cells, as an example, 34 cells in FIG. 6) which are disposed in a row along the main scanning direction. Further, in the first embodiment, the position on the light-receiving portion of the CCD line sensor 44 which corresponds to the position of each edge of documents of various sizes, which crosses the sensing area of the CCD line sensor 44, on the platen glass 16 is converted into the number of pixels (the number of cells) counted from the pixel which corresponds to the first registration position and determined in advance (see FIG. 6).

The control portion 54 stores a value in which the distance between the first registration position and the position at which each sensing region starts is converted into the number of pixels. The distance is obtained based on the size of each sensing region and the position on the light-receiving portion of the CCD line sensor 44 which corresponds to the position of each edge of the documents of various sizes, which crosses the sensing area of the CCD line sensor 44 on the platen glass 16 (as an example, see Table 1 below). The control portion 54 outputs the data as a sensing start position ($S_n$: n is a number of sensing region) to the size detection portion 58.

TABLE 1

| Sensing Region Number | #1 | #2 | #3 | #4 | #5 | #6 | #7 | #8 |
|---|---|---|---|---|---|---|---|---|
| Start Position (Number of Pixels) | 48 | 2769 | 2929 | 3210 | 3370 | 3950 | 4110 | 4580 |

Further, the size detection portion 58, to be described later, compares the image data outputted from the cells within each sensing region to a threshold value, sets the results of comparison to a status register, and thereafter, outputs the results to the control portion 54. The control portion 54 outputs the aforementioned threshold value which is determined for every sensing region to the size detection portion 58. At the same time, in a case in which the control portion 54 wants to hold the value at the status register, the control portion 54 outputs a register hold signal to the size detection portion 58. In a case in which the control portion 54 wants to reset the value at the status register, the control portion 54 outputs a register reset signal to the size detection portion 58.

Figure 7A:
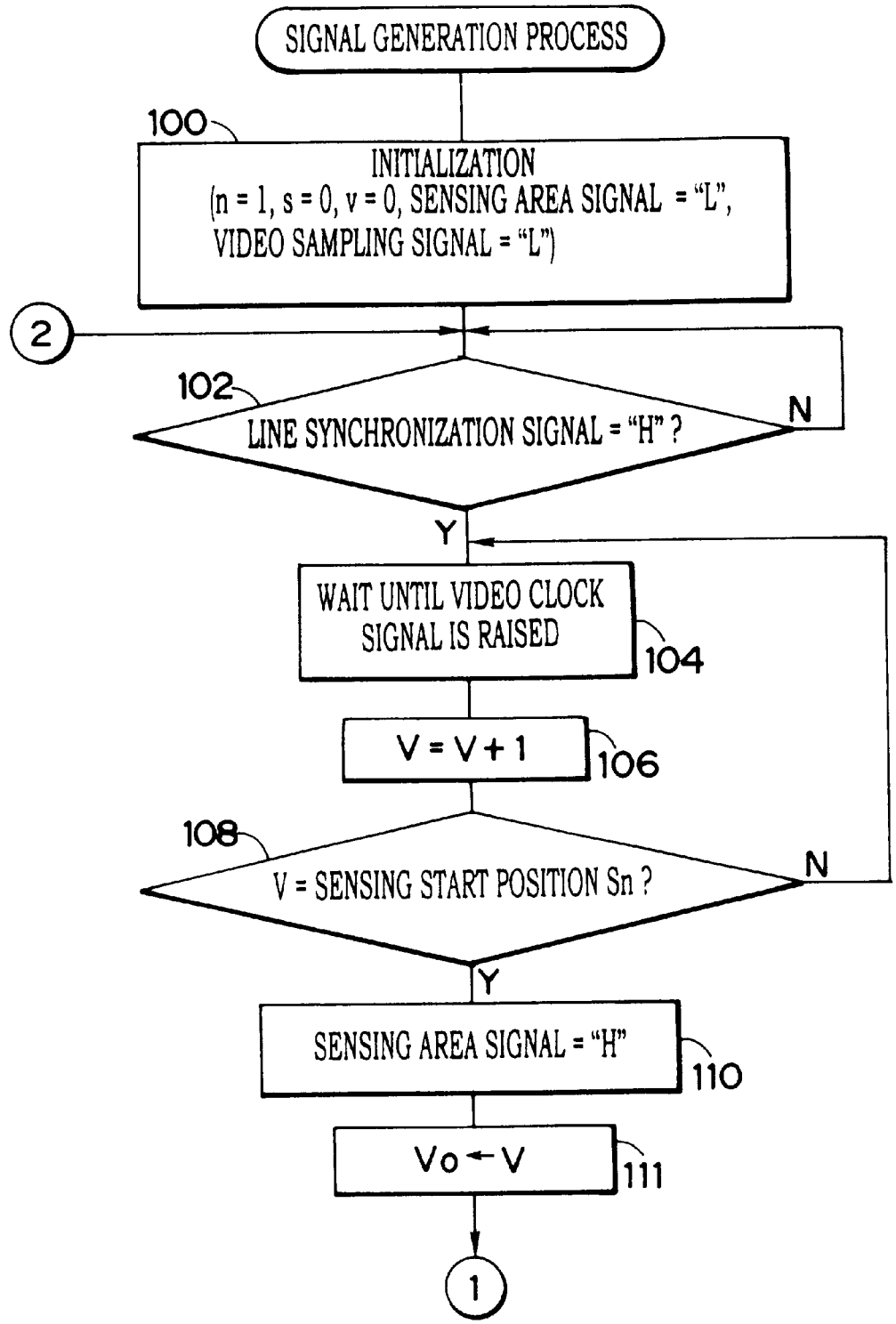
FIGS. 7A and 7B are flowcharts for describing a signal generation process which is effected at a size detection portion.
Figure 7B:
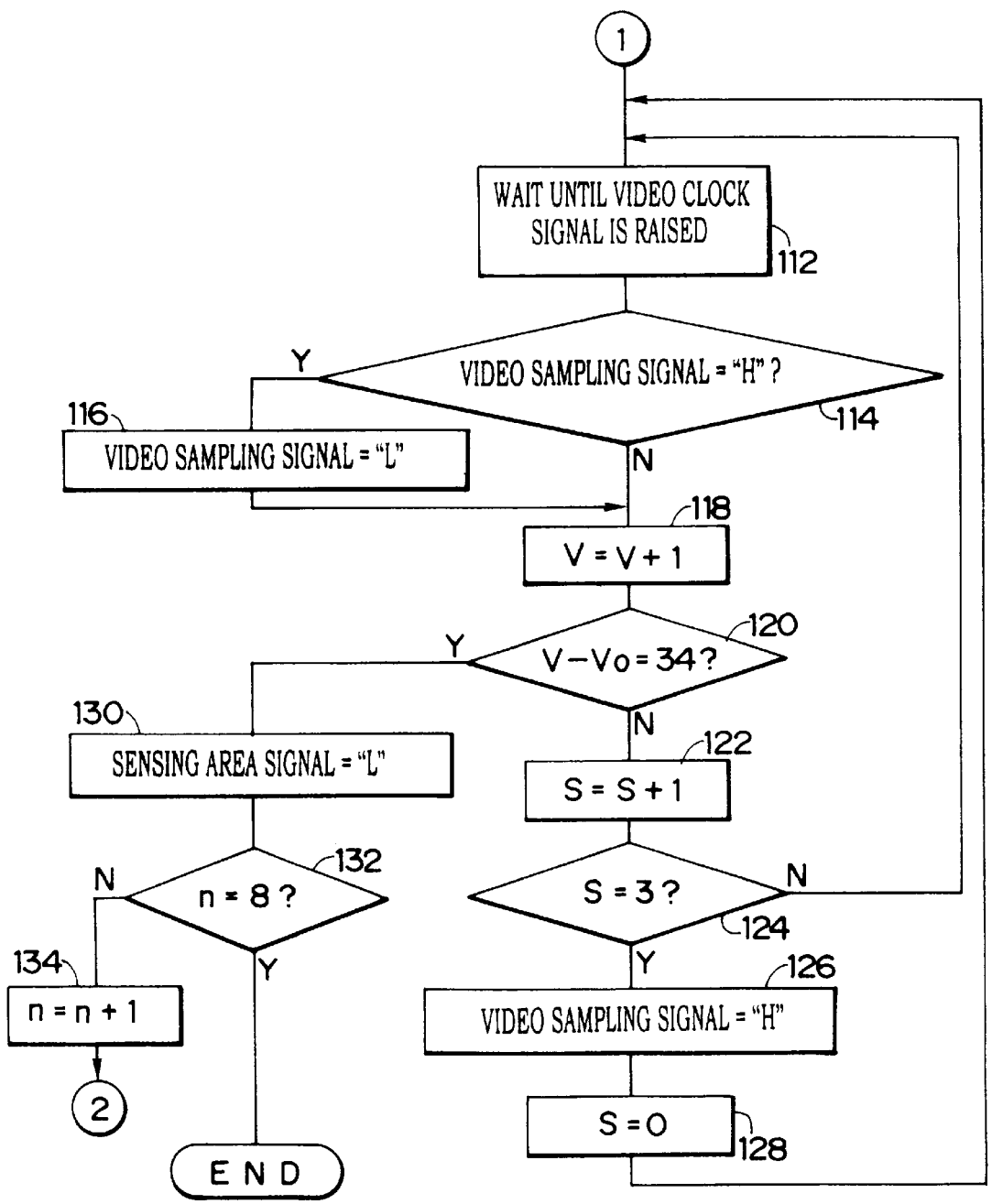

Next, a process of generating a signal will be explained with reference to flowcharts shown in FIGS. 7A and 7B. The process of generating a signal is effected at the size detection portion 58 when, in order to detect the size of the document disposed on the platen glass 16, the control portion 54 releases holding of the value in the status register by a register hold signal, and further, outputs a register reset signal.

In step 100, an initialization process is performed by substituting 1 for a sensing region number n, by substituting 0 for counters s and v, and by lowering ("L") the levels of a sensing area signal and a video sampling signal (both signals are signals within the size detection portion 58). In a subsequent step 102, a determination is made as to whether the level of a line synchronization signal inputted from the control portion 54 is high ("H"). When the answer to the determination in step 102 is "No", the process waits until the determination in step 102 is "Yes".

Figure 8:
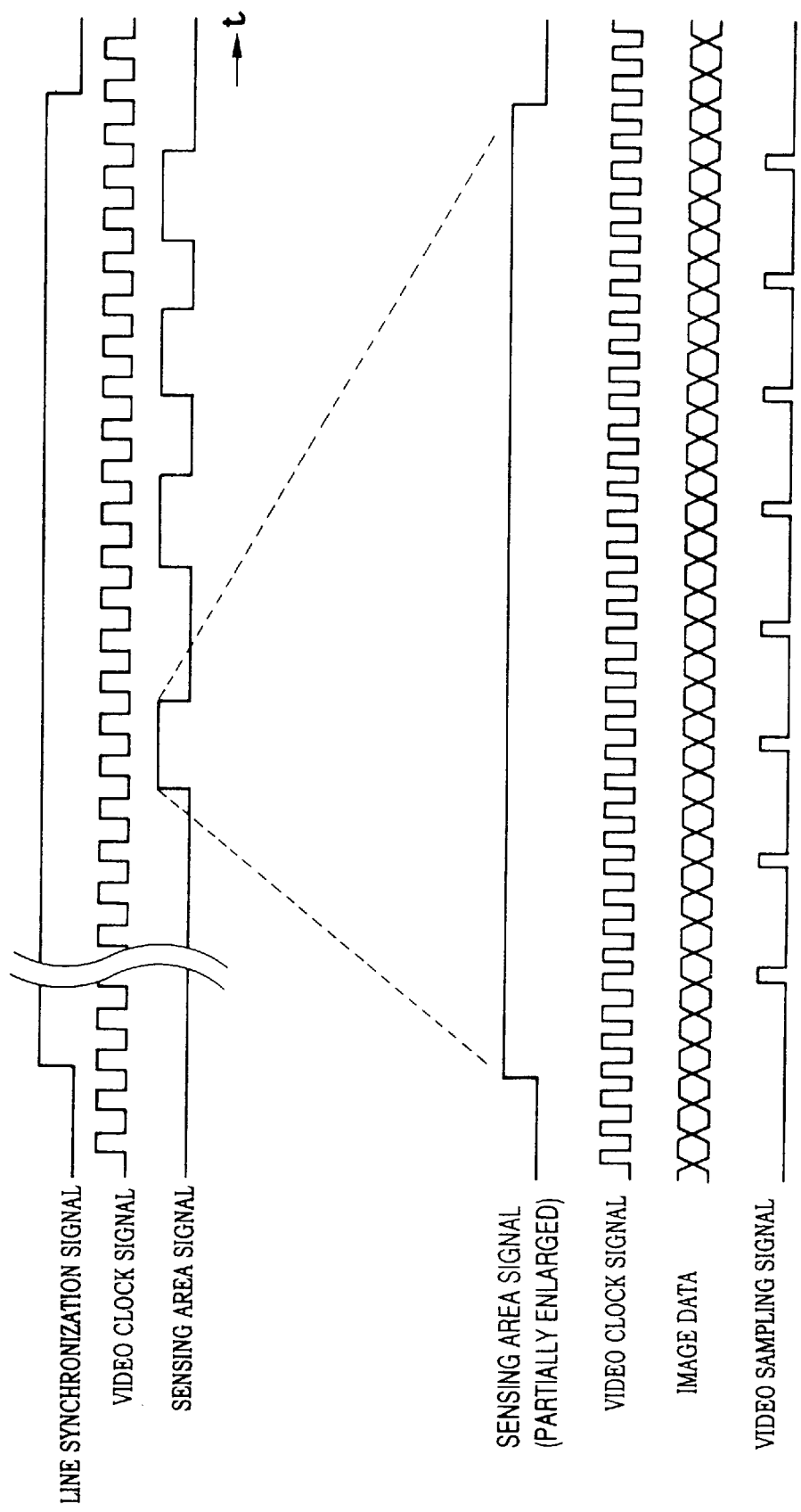
FIG. 8 is a timing chart showing a relationship among a line synchronization signal, a video clock signal, a sensing area signal, an image data and a video sampling signal relating to the first embodiment.

The CCD line sensor 44 synchronizes the signals from the respective cells with a video clock signal, and repeatedly outputs the signals successively from the cell which is positioned at the end portion side corresponding to the first registration position side along the main scanning direction. As illustrated in FIG. 8, the aforementioned line synchronization signal becomes high at a timing synchronized with which the signal outputted from the cell, which is positioned so as to correspond to the first registration position, is inputted as an image data to the size detection portion 58 via the CCD driver 56. The line synchronization signal is kept high until the signal outputted from the cell corresponding to the second registration position is inputted as an image data to the size detection portion 58 via the CCD driver 56.

When the level of the line synchronization signal is "H", the answer to the determination in step 102 is "Yes". Then, the process proceeds to step 104 and waits until the video clock signal inputted from the control portion 54 is raised (becomes high). In a subsequent step 106, the value of the counter v is counted up. In a next step 108, a determination is made as to whether the value of the counter v is equal to the value of a sensing start position $S_n$. When the answer to the determination in step 108 is "No", the process returns to step 104. Steps 104 through 108 are repeated until the answer to the determination in step 108 is "Yes".

In the above description, the number of clocks of the video clock signal after the level of the line synchronization signal is "H", i.e., the number of pixels inputted as an image data to the size detection portion 58 is held at the counter v. By comparing the value of the counter v with the sensing start position $S_n$, a determination is made as to whether the inputting of the image data at the sensing region #n is started.

When the answer to the determination in step 108 is "Yes", the level of the sensing area signal (see FIG. 8) is "H" in step 110. In a subsequent step 111, a variable vo is substituted for the value of the counter v. In step 112, the process waits until the video clock signal is raised. In step 114, a determination is made as to whether the level of the video sampling signal is "H". When the answer to the determination in step 114 is "No", in step 118, the value of the counter v is counted up. In step 120, a determination is made as to whether the value in which the value of variable vo is subtracted from the value of the counter v is "34" ("34" is the number of pixels (cells) which forms a single sensing region).

When the answer to the determination in step 120 is "No", the process moves to step 122 where the value of the counter s is counted up. In step 124, a determination is made as to whether the value of the counter s is "3". When the answer to the determination in step 124 is "No", the process returns to step 112 and steps 112 through 124 are repeated. When the processing of step 122 is performed three times, the answer to the determination in step 124 is "Yes". In step 126, the level of the video sampling signal is "H" (see FIG. 8). In step 128, the value of the counter s returns to 0 and the process returns to step 112. In this case, since the answer to the determination in step 114 is "Yes" after step 112, the process proceeds to step 116. After the level of the video sampling signal is "L", the process moves to step 118.

According to the above description, as illustrated in FIG. 8, while the image data from the respective cells within the sensing region #n is inputted, i.e., while the answer to the determination in step 120 is "No" (while the level of the sensing area signal is "H"), every time three cycles of the video clock signal pass, the level of the video sampling signal during the next one cycle is "H".

When the answer to the determination in step 120 is "Yes", it is determined that the inputting of the image data from the respective cells within the sensing region #n has finished. In step 130, the level of the sensing area signal is "L". In a subsequent step 132, a determination is made as to whether the sensing region number n is "8", i.e., whether the image data of all of the sensing regions #1 through #8 have inputted. When the answer to the determination in step 132 is "No", the value of the sensing region number n is counted up in step 134. Thereafter, the process returns to step 102, and the processes after step 102 are repeated. When the answer to the determination in step 132 is "Yes", the process is completed.

Figure 9B:
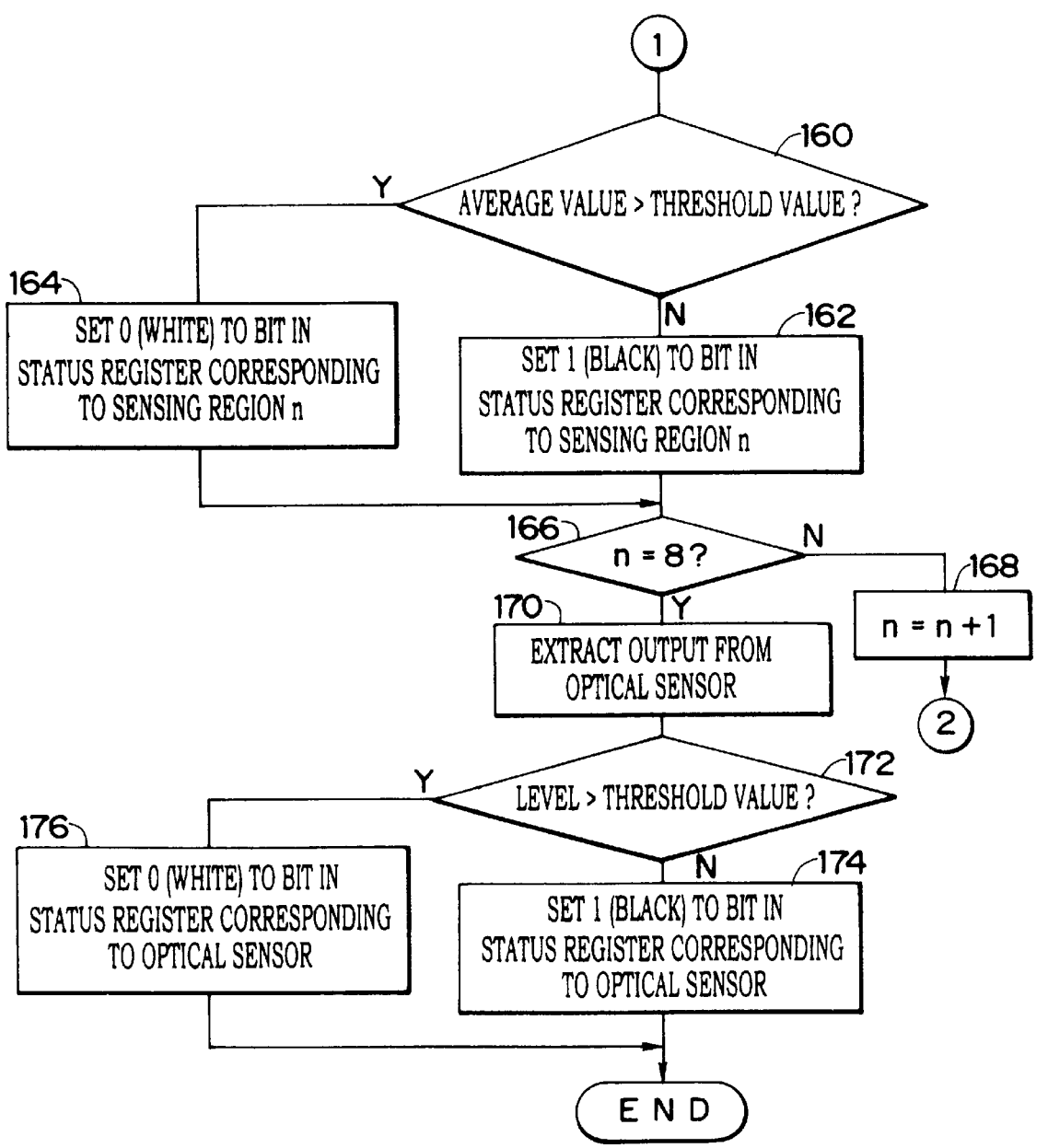

Next, a process of sensing an area, which is performed at the size detection portion 58 alongside with the previously-described process of generating a signal, is explained with reference to flowcharts shown in FIGS. 9A and 9B. In step 140, an initialization process is performed by substituting 1 for a sensing region number n and the like. In step 142, the process waits until the video clock signal is raised. In a subsequent step 144, a determination is made as to whether the level of a line synchronization signal is "H". When the answer to the determination in step 144 is "No", the process returns to step 142. Steps 142, 144 are repeated until the answer to the determination in step 144 is "Yes". When the answer to the determination in step 144 is "Yes", in step 146, a determination is made as to whether the level of a sensing area signal is "H". When the answer to the determination in step 146 is "No", the process returns to step 142. Steps 142 through 146 are repeated until the answer to the determination in step 146 is "Yes".

When the answer to the determination in step 146 is "Yes", the process proceeds to step 148. In step 148, a determination is made as to whether the level of a video sampling signal is "H". When the answer to the determination in step 148 is "No", in step 150, the process waits until the video clock signal is raised. In a subsequent step 152, a determination is made as to whether the level of the sensing area signal continues to be "H". When the answer to the determination in step 152 is "Yes", the process returns to step 148. When the answer to the determination in step 148 is "Yes", in step 154, one pixel of the image data inputted from the CCD driver 56 is extracted and stored in a memory or the like. In a subsequent step 156, the process waits until the video clock signal is raised, and thereafter, returns to step 148.

As mentioned before, while the level of the sensing area signal is "H", every time three cycles of the video clock signal pass, the level of the video sampling signal is "H" during the next one cycle. Accordingly, in the above description, among 34 pixels which form a single sensing region, only the data of eight pixels ①  through ⑧, which are hatched in FIG. 6, are extracted and stored.

When the extraction of the image data from the single sensing region is completed, the answer to the determination in step 152 is "No". Consequently, the process proceeds to step 158 where the average value of the data of eight pixels, which are extracted and stored from the sensing region "n" in accordance with the previously-described process, is calculated. In a subsequent step 160, a determination is made as to whether the average value calculated in step 158 is greater than the threshold value, for determining the sensing region #n, which is inputted from the control portion 54.

When the answer to the determination in step 160 is "No", the average value of the amount of light received by each cell within the sensing region #n is smaller than or equal to the threshold value. Therefore, in step 162, the value ("1") which indicates that the amount of received light is low (i.e., "black") is set to the bit in the status register corresponding to the sensing region #n. Then, the process moves to step 166. Further, when the answer to the determination in step 160 is "Yes", the average value of the amount of light received by each cell within the sensing region #n is greater than the threshold value. Therefore, in step 164, the value ("0") which indicates that the amount of received light is high (i.e., "white") is set to the bit in the status register corresponding to the sensing region #n. Then, the process moves to step 166.

In step 166, a determination is made as to whether the sensing region number n is "8", i.e., whether the above-described process is effected on all of the sensing regions #1 through #8. When the answer to the determination in step 166 is "No", in step 168, the value of the sensing region number n is counted up. Thereafter, the process returns to step 142, and the above-described process after step 142 is repeated.

Moreover, when the answer to the determination in step 166 is "Yes", the process moves to step 170 where the signal which is outputted from the optical sensor 60 is extracted. In a subsequent step 172, a determination is made as to whether the level of the signal extracted from the optical sensor 60 is greater than the predetermined threshold value.

When the answer to the determination in step 172 is "No", the amount of light received by the optical sensor 60 is smaller than or equal to the threshold value. Therefore, in step 174, the value ("1") which indicates that the amount of received light is low (i.e., "black") is set to the bit in the status register corresponding to the optical sensor 60, and thereafter, the process is completed. Further, when the answer to the determination in step 172 is "Yes", the amount of light received by the optical sensor 60 is greater than the threshold value. Therefore, in step 176, the value ("0") which indicates that the amount of received light is high (i.e., "white") is set to the bit in the status register corresponding to the optical sensor 60, and thereafter, the process is completed.

As described above, in accordance with the amount of light received by each cell within the sensing regions #1 through #8 with respect to the threshold value and the amount of light received by the optical sensor 60 with respect to the threshold value, the corresponding values are set to each bit in the status register.

Figure 10A:
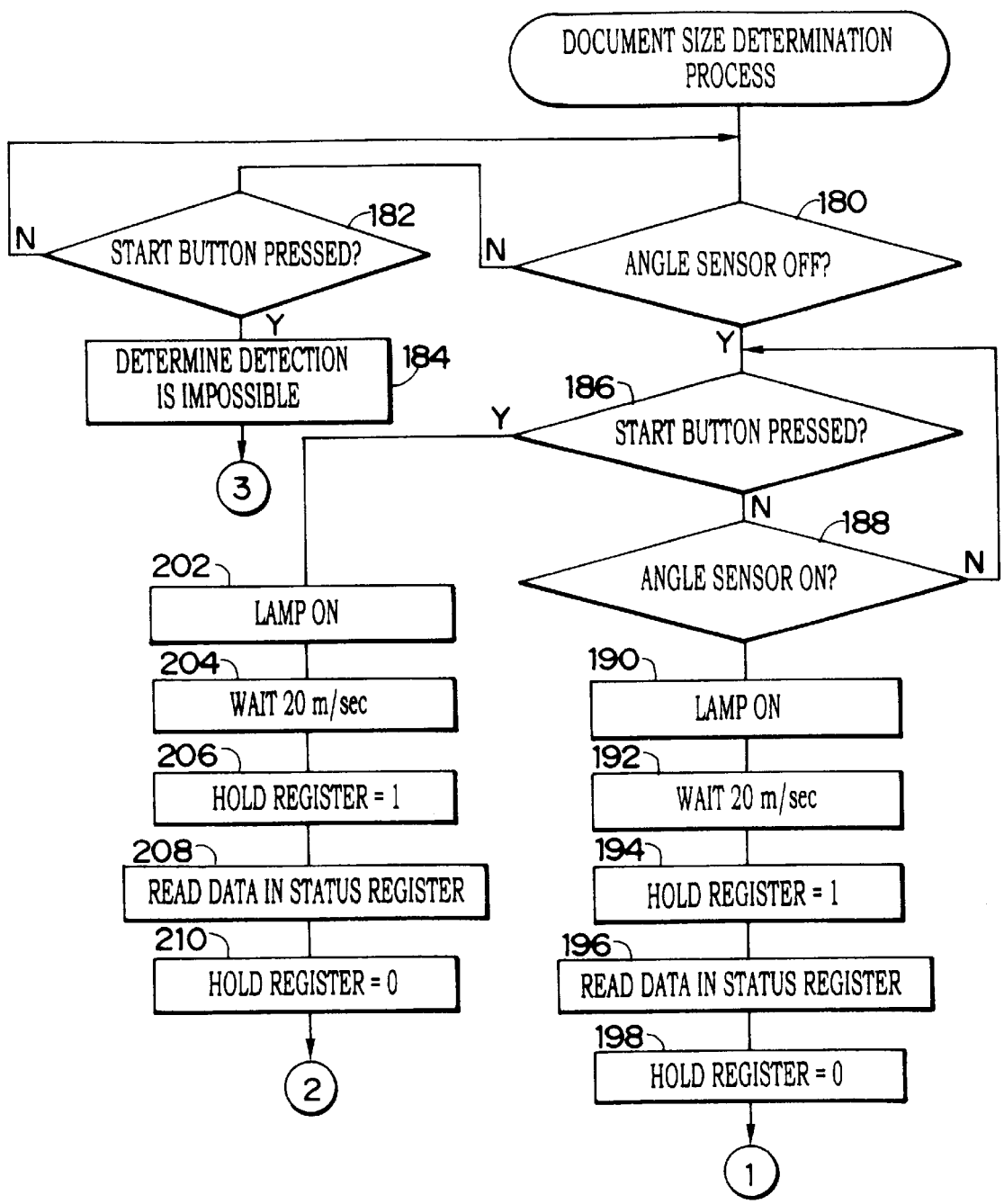
FIGS. 10A and 10B are flowcharts for describing a document size determination process which is effected at the control portion.
Figure 10B:
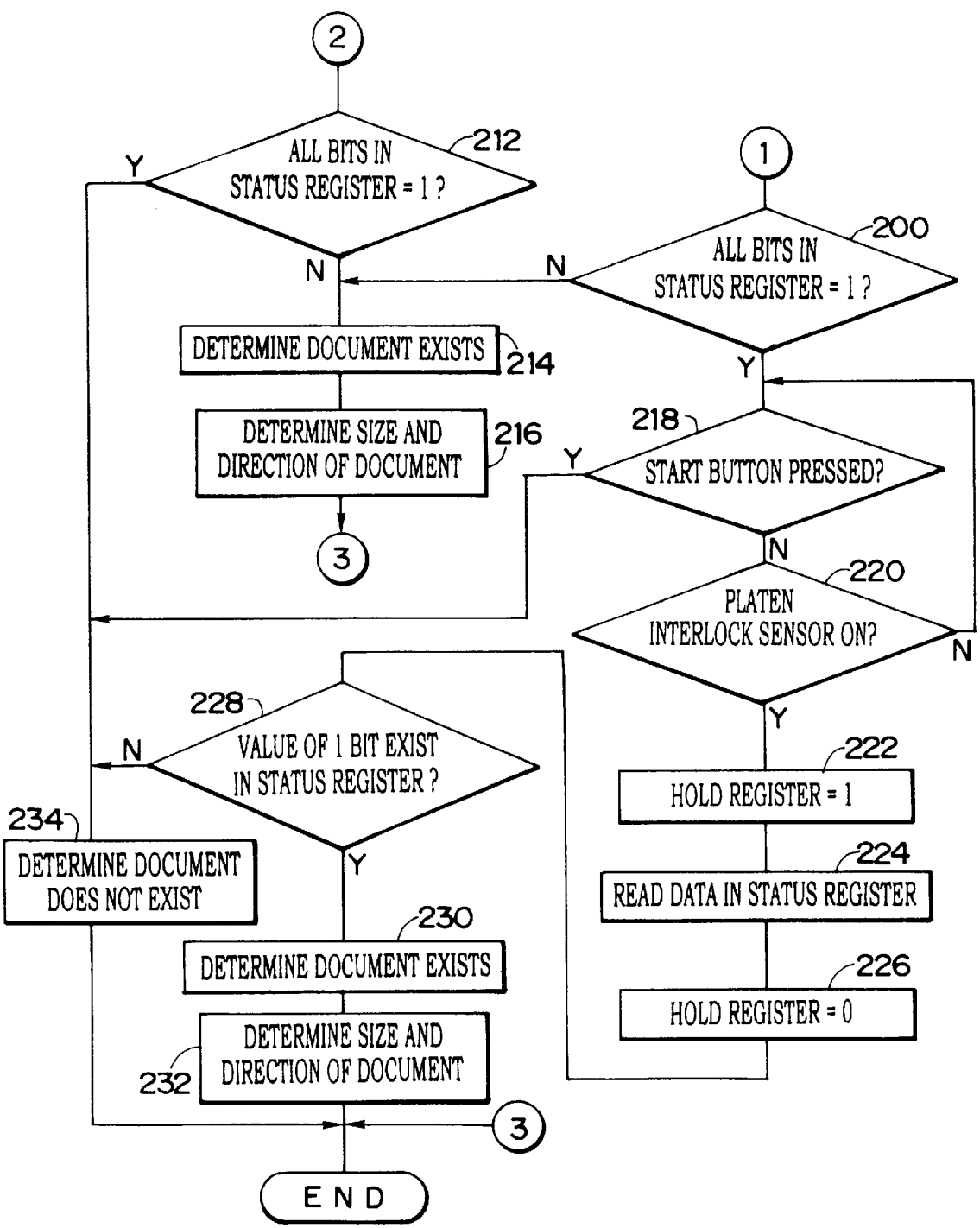

Next, a process of determining the size of a document which is effected at the control portion 54 will be explained with reference to flowcharts shown in FIGS. 10A and 10B. The process of determining the document size is carried out in a standby state in which the document is not read or the like. The carriage members 46, 48 are positioned at home positions, and the sensing area of the CCD line sensor 44 is positioned in the hatched area shown in FIG. 5.

In step 180, a determination is made as to whether the angle sensor 28 is turned off (the state in which the platen cover 24 opens more than a predetermined angle from the closed state). When the answer to the determination in step 180 is "No", in step 182, a determination is made as to whether a start button for indicating the start of copying of the document is pressed. When the answer to the determination in step 182 is also "No", the process returns to step 180, and steps 180, 182 are repeated until any of the answers to the above determinations is "Yes".

When the start button is pressed so that the answer to the determination in step 182 is "Yes", it is difficult to determine whether the document is disposed on the platen glass 16, and when the document is disposed, it is difficult to detect accurately the size of the document. In step 184, it is thus determined that the detection is impossible, and the process is completed. In this case, the size of the recording paper or the like is selected by a user.

On the other hand, when the angle sensor 28 is turned off so that the answer to the determination in step 180 is "Yes", in step 186, a determination is made as to whether the start button is pressed. When the answer to the determination in step 186 is "No", in step 188, a determination is made as to whether the angle sensor 28 is turned on (whether the platen cover 24 is temporarily moved to an open position, and thereafter, is rotated to a closed position so that the platen cover 24 starts to close). When the answer to the determination in step 188 is "No", the process returns to step 186. Steps 186, 188 are repeated until the answer to any of the above-described determinations is "Yes".

When the angle sensor 28 is turned on so that the answer to the determination in step 188 is "Yes", in step 190, the lamp 34 is turned on. In step 192, the process waits for a predetermined period of time (e.g., 20 m/sec.) until the amount of light of the lamp 34 is stabilized. In a subsequent step 194, the hold register is set to "1". As a result, the release of holding of the data which is set to the status register is indicated at the size detection portion 58, and the register reset signal is outputted. In a subsequent step 196, the data which is set to the status register in accordance with the previously-described area sensing process is read. Moreover, in step 198, the hold register is set to "0". As a result, the register hold signal is outputted and the data which is set to the status register is held.

In a subsequent step 200, a determination is made as to whether all of the bits in the status register are "1" ("black"). The processes of the aforementioned steps 190 through 198 are performed in a state in which the platen cover 24 starts to close, i.e., before the platen cover 24 is closed. The light which has been irradiated from the lamp 34 and reflected by the surface of the platen cushion 26 is hardly incident on the CCD line sensor 44. Accordingly, if the document is not disposed on the platen glass 16, the amount of light received by each cell of the sensing regions #1 through #8 and the amount of light received by the optical sensor 60 are smaller than or equal to the threshold value. All of the bits in the status register are set to "1".

Therefore, when the answer to the determination in step 200 is "No", i.e., at least any of the bits in the status register is "0", the process proceeds to step 214 where it is determined that the document whose background is white or closer to white is disposed on the platen glass 16 (the white document exists). In a subsequent step 216, on the basis of the value of each bit in the status register, the direction and size of the document are determined. Thereafter, the process is completed.

In this step 216, regarding the results of detection of the sensing regions #1 through #8 and the optical sensor 60 which are indicated by the status register, if the value of corresponding bit in the status register is "0", the value is replaced by "document exists", and if the value thereof is "1", the value is replaced by "document does not exist". The size and direction of the document are determined in accordance with the following Table 2.

TABLE 2

| #1 | #2 | #3 | #4 | #5 | #6 | #7 | #8 | Size/Direction |
|----|----|----|----|----|----|----|----|----------------|
| ○ | × | × | × | × | × | × | × | B5/SEF |
| ○ | ○ | × | × | × | × | × | × | B5/SEF |
| ○ | — | ○ | × | × | × | × | × | A4/SEF |
| ○ | — | — | ○ | × | × | × | × | A4/SEF |
| ○ | — | — | — | ○ | × | × | × | B4/SEF |
| ○ | — | — | — | — | ○ | × | × | B4/SEF |
| ○ | — | — | — | — | — | ○ | × | A3/SEF |
| ○ | — | — | — | — | — | — | ○ | A3/SEF |
| × | × | × | × | × | × | × | × | B5/LEF |
| × | ○ | × | × | × | × | × | × | A5/LEF |
| × | — | ○ | × | × | × | × | × | A5/LEF |
| × | — | — | ○ | × | × | × | × | A5/LEF |
| × | — | — | — | ○ | × | × | × | B5/LEF |
| × | — | — | — | — | ○ | × | × | B5/LEF |
| × | — | — | — | — | — | ○ | × | A4/LEF |
| × | — | — | — | — | — | — | ○ | A4/LEF |

SEF = transverse direction
LEF = longitudinal direction

Wherein, in Table 2, "○" indicates that "document exists", "×" indicates that "document does not exist", and "—" indicates that normally "document exists", however, even if "document does not exist", the result of determination is not changed (i.e., "Don't Care"). In Table 2, the results of detection of the sensing region #1 are not used for determining the size and direction of the document. However, the results of detection of the sensing area #1 are used to confirm whether the document is accurately disposed on the platen glass 16, i.e., the document is disposed on the platen glass 16 such that any of the four corner portions of the document corresponds to the corner portion, of the platen glass 16, which is positioned at the location to which the document registration mark 20 is applied, and that two edges of the document abut the inner surfaces of the registration guide plate 18.

In the above-description, compared to the case in which the size and direction of the document are determined by moving the sensing area of the CCD line sensor 44 along the sub-scanning direction, because the size and direction of the document are determined without moving the sensing area of the CCD line sensor 44, the process is completed in a short time.

On the other hand, when the answer to the determination in step 200 is "Yes", i.e., when all of the bits in the status register which are extracted in a state in which the platen cover 24 starts to close are "1", the document is not disposed on the platen glass 16, or the document whose background is black is disposed on the platen glass 16. Accordingly, the process moves to step 218, and a determination is made as to whether the start button is pressed. When the answer to the determination in step 218 is "No", in step 220, a determination is made as to whether the platen interlock sensor 30 is turned on (whether the platen cover 24 is closed). When the determination in step 220 is "No", the process returns to step 218. Steps 218, 220 are repeated until the answer to any of the above-described determinations is "Yes".

When the platen cover 24 is closed and the start button is pressed before the platen interlock sensor 30 is turned on, it cannot be judged whether the document is not disposed on the platen glass 16 or the document whose background is black is disposed on the platen glass 16. Accordingly, in the first embodiment, in step 234, it is determined that the document does not exist, and thus, the process is completed. When it cannot be judged whether the document is not disposed on the platen glass 16 or the document whose background is black is disposed on the platen glass 16, instead of determining that the document does not exist, it may be determined that detection is impossible.

On the other hand, when the platen cover 24 is closed and the platen interlock sensor 30 is turned on, the process moves to step 222. In steps 222 through 226, similarly to steps 194 through 198, data which is set to the status register is extracted. In subsequent step 228, a determination is made as to whether a value of "1" bit exists in the status register.

When the determination in step 228 is effected, all of the bits in the status register are "1" in a state in which the platen cover 24 starts to close. Therefore, a possibility that the document whose background is white or closer to white is disposed on the platen glass 16 can be eliminated. Since the surface of the platen cushion 26 is white, when the platen cover 24 is fully closed, in a case in which the document whose background is black or closer to black is not disposed on the platen glass 16, all of the bits in the status register are "0" (white).

Accordingly, when the answer to the determination in step 228 is "No", in step 234, it is determined that the document does not exist and the process is completed. When the answer to the determination in step 228 is "Yes", the process moves to step 230 where it is determined that the document whose background is black or closer to black is disposed on the platen glass 16 (the black document exists). In a subsequent step 232, on the basis of the values of the respective bits in the status register, the direction and size of the document on the platen cover 16 are determined. Then the process is completed. In this step 232, regarding the results of detection of the sensing regions #1 through #8 and the optical sensor 60 which are indicated by the status register, if the values of corresponding bits in the status register are "0", the values are replaced by "document does not exist", and if the values thereof are "1", the values are replaced by "document exists". In accordance with the above Table 2, the size and direction of the document are determined.

On the other hand, when the start button is pressed before the angle sensor 28 is turned on (the platen cover 24 remains open), the answer to the determination in step 186 is "Yes", and the process moves to step 202. In steps 202 through 210, the process which is the same as the process in the previous steps 190 through 198 is performed. In step 212, a determination is made as to whether all of the bits in the status register are "1". As in the same way as the above-described case in which the platen cover 24 starts to close, even when the platen cover 24 is open, unless the document is disposed on the platen glass 16, the amount of light received by each cell within the sensing regions #1 through #8 and the amount of light received by the optical sensor 60 are smaller than or equal to the threshold value. Accordingly, "1" is set to all of the bits in the status register.

As a result, when the answer to the determination in step 212 is "No", the process proceeds to step 214 where it is determined that "white document exists". In step 216, the size and direction of the aforementioned document are determined. Moreover, when the answer to the determination in step 212 is "Yes", it cannot be judged whether the document is not disposed on the platen glass 16 or the document whose background is black is disposed on the platen glass 16. In step 234, it is determined that the document does not exist, and the process is completed.

To sum up, determinations of the existence of the document in the above-described process are shown in the following Table 3.

TABLE 3

| State of Platen Cover | Results of Detection of Each Sensing Region and Optical sensor | | |
| --- | --- | --- | --- |
| Starting to Close | White Exists | Black Only | Black Only |
| Closed | — | White Only | Black Exists |
| Results of Determination | White Document Exists | No Document | Black Document Exists |

As described above, in the first embodiment, because the size and direction of the document are determined on the basis of the CCD line sensor 44, there is no need to provide a plurality of new sensors for detecting the size and direction of the document. Moreover, since the size and direction of the document are determined without moving the sensing area of the CCD line sensor 44, compared to the case of effecting a pre-scan in which the size and direction of the document are determined by scanning the sensing area of the CCD line sensor 44 along the sub-scanning direction, the process is completed in a short time.

Further, when sensing is carried out in a state in which the platen cover 24 starts to close and all of the results of detection of the sensing regions #1 through #8 and the optical sensor 60 are "black", additional sensing is effected when the platen cover 24 is closed so as to determine the existence of the document. Consequently, even if the document whose background is black or closer to black is disposed on the platen glass 16, the size and direction of the document can be accurately detected.

Further, when the size of the document is determined by using signals outputted from all of the cells of the CCD line sensor 44, a memory with large capacity or the like for storing the levels of signals outputted from respective cells or the like may be needed. In the above description, since only the signals outputted from respective cells within the sensing regions #1 through #8 are used, it is not necessary to provide a memory with large capacity or the like.

Further, in the above description, the sensing start position serving as the position of sensing region is inputted from the control portion 54 to the size detection portion 58. Accordingly, even when the position of the sensing region is changed as the size of the document to be detected is changed, the position of the sensing region can be easily changed by changing the sensing start position which is inputted from the control portion 54 to the size detection portion 58. Therefore, when the size of the document to be detected is changed, it is not necessary to change the position of the sensor or to carry out pre-scan.

In the first embodiment, when sensing is carried out in a state in which the platen cover 24 starts to close and any of the results of detection of the sensing regions #1 through #8 and the optical sensor 60 is "white", it is determined that "white document exists", and thereafter, the size and direction of the document are determined.

However, additional sensing may be carried out in a state in which the platen cover 24 is closed, so as to determine the size and direction of the document. In this case, normally it cannot happen, however, logically it can happen that any of the results of detection of the sensing regions #1 through #8 and the optical sensor 60 is "white" when the sensing is effected in a state in which the platen cover 24 starts to close, and any of the results of detection of the sensing regions #1 through #8 and the optical sensor 60 is "black" when the sensing is effected in a state in which the platen cover 24 is closed. However, in this case, it is considered that "white" or "black" is detected by the image recorded onto the document, and that from the state in which the platen cover 24 starts to close to the state in which the platen cover 24 is closed, the position at which the document is disposed deviates from the original position. Therefore, it is preferable to determine that the document exists.

Second Embodiment

Next, a second embodiment of the present invention will be explained. Since the structures of the second embodiment are similar to those of the first embodiment, members which are the same as those of the first embodiment are denoted by the same reference numerals, and descriptions thereof are omitted. The operation of the second embodiment will be explained hereinafter.

In the second embodiment, three sensing areas #1 through #3 illustrated in FIG. 11 are determined as the sensing areas of the CCD line sensor 44, which are used when the size of the document is determined.

In a case in which the document of B5 size is disposed on the platen glass 16 in the transverse direction thereof, the sensing area #1 is determined so as to continuously cross a specific edge (the edge 64A in FIG. 11) of the document which intersects the sensing area of the CCD line sensor 44. Moreover, in a case in which the document of A4 size is disposed on the platen glass 16 in the transverse direction thereof and in a case in which the document of A5 size is disposed on the platen glass 16 in the longitudinal direction thereof, the sensing area #2 is determined so as to continuously cross a specific edge (the edge 64B in FIG. 11) of the document which crosses the sensing area of the CCD line sensor 44. Further, in a case in which the document of B4 size is disposed on the platen glass 16 in the transverse direction thereof and in a case in which the document of B5 size is disposed on the platen glass 16 in the longitudinal direction thereof, the sensing area #3 is determined so as to continuously cross a specific edge (the edge 64C in FIG. 11) of the document which crosses the sensing area of the CCD line sensor 44.

FIG. 12 shows conceptually a light-receiving portion of the CCD line sensor 44. In the second embodiment, sensing regions #1 through #3 (a plurality of small regions in the present invention, more particularly, the regions which correspond to the small regions described in claim 7) are determined in advance on the light-receiving portion of the CCD line sensor 44 so as to correspond to the sensing areas #1 through #3 in FIG. 11. The sensing regions #1 through #3 are formed by a plurality of pixels (=cells) which are disposed in a row along the main scanning direction.

The control portion 54 relating to the second embodiment also stores a value in which the distance between the first registration position and the position at which each sensing region starts is converted into the number of pixels. The distance is obtained based on the size of each sensing region and the position on the light-receiving portion of the CCD line sensor 44 which corresponds to the position of each edge of the documents of the various sizes, which crosses the sensing area, on the platen glass 16 (as an example, see Table 4 below). The control portion 54 outputs the data as a sensing start position ($S_n$: n is a number of sensing region) to the size detection portion 58.

TABLE 4

| Sensing Region Number | #1 | #2 | #3 |
|---|---|---|---|
| Start Position (Number of Pixels) | 2769 | 3210 | 3950 |

Further, the size detection portion 58 relating to the second embodiment, which will be described later, compares difference in the image data which is successively outputted from the cells within each sensing region to a threshold value so as to effect edge detection, sets the results of detection to a status register, and thereafter, outputs the results to the control portion 54. The control portion 54 outputs the threshold values for edge detection at every sensing region to the size detection portion 58.

Figure 13:
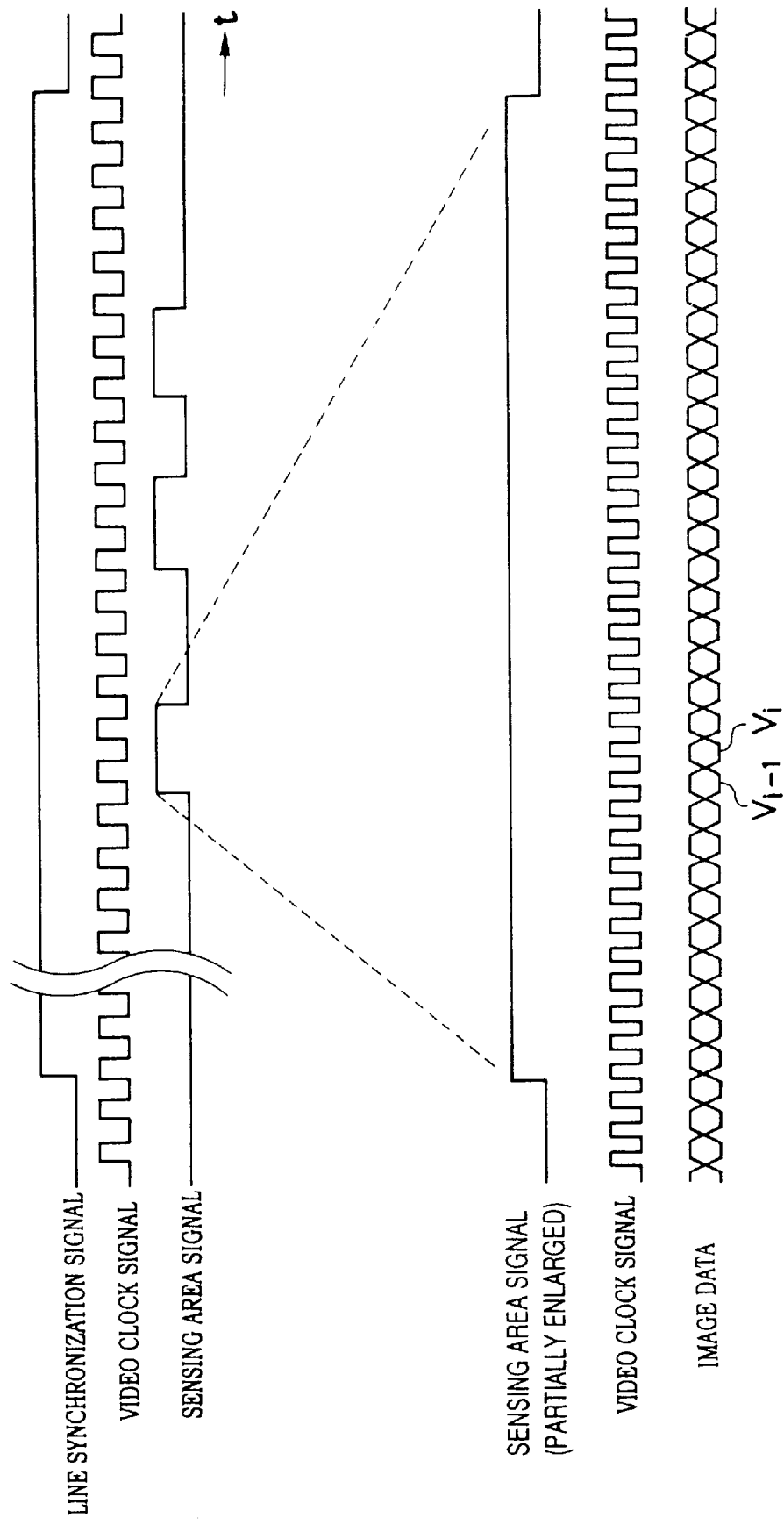
FIG. 13 is a timing chart showing a relationship among a line synchronization signal, a video clock signal, a sensing area signal and an image data relating to the second embodiment.

Next, a process in the size detection portion 58 will be explained. In the second embodiment, the size detection portion 58 generates only a sensing area signal (the signal which is high when the image data from the cells within respective sensing regions #1 through #3 are inputted to the size detection portion 58: see FIG. 13) as in the same way as the signal generation process described in the first embodiment. A video sampling signal is not generated.

Figure 14A:
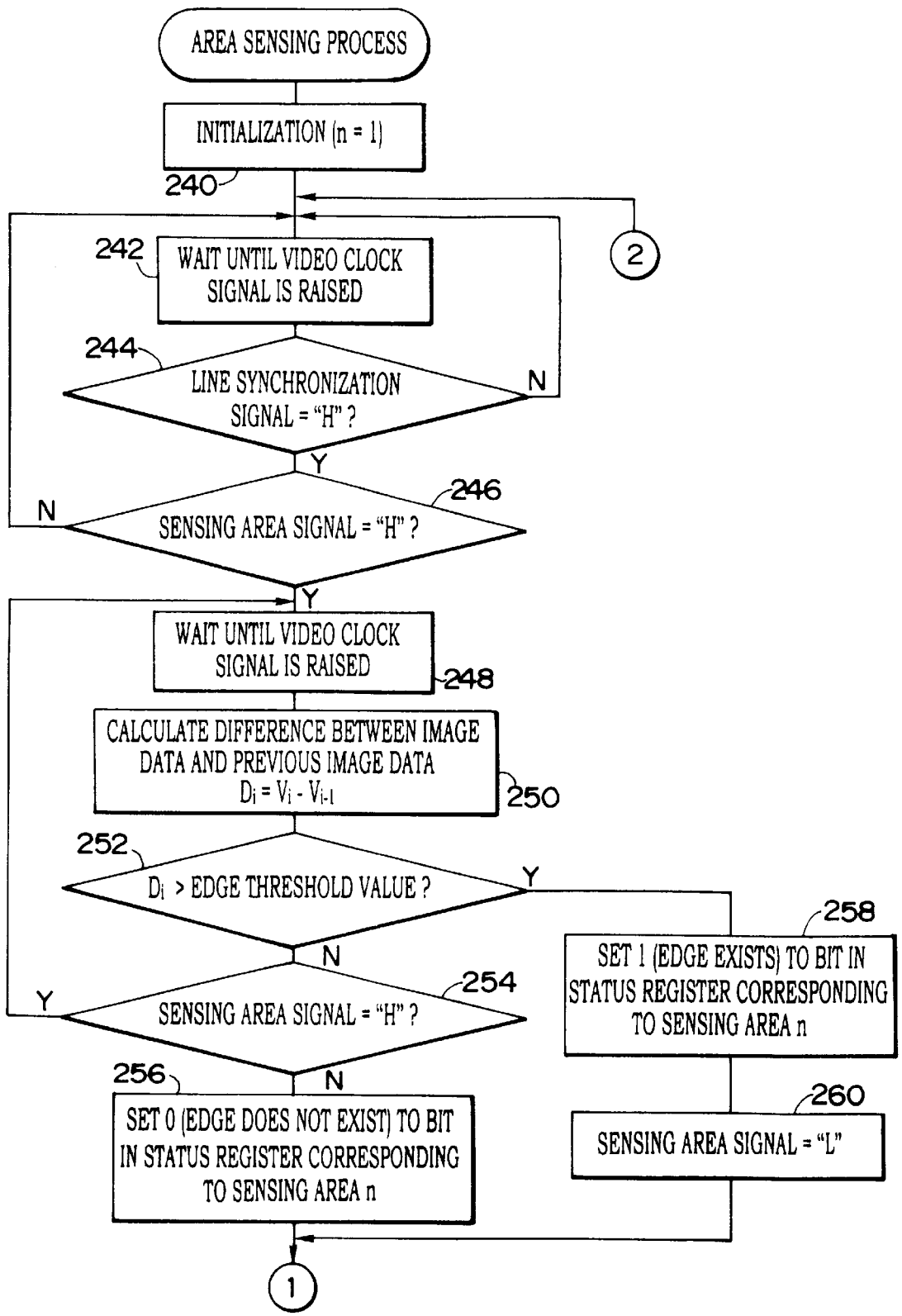
FIGS. 14A and 14B are flowcharts for describing an area sensing process which is effected at a size detection portion relating to the second embodiment.
Figure 14B:
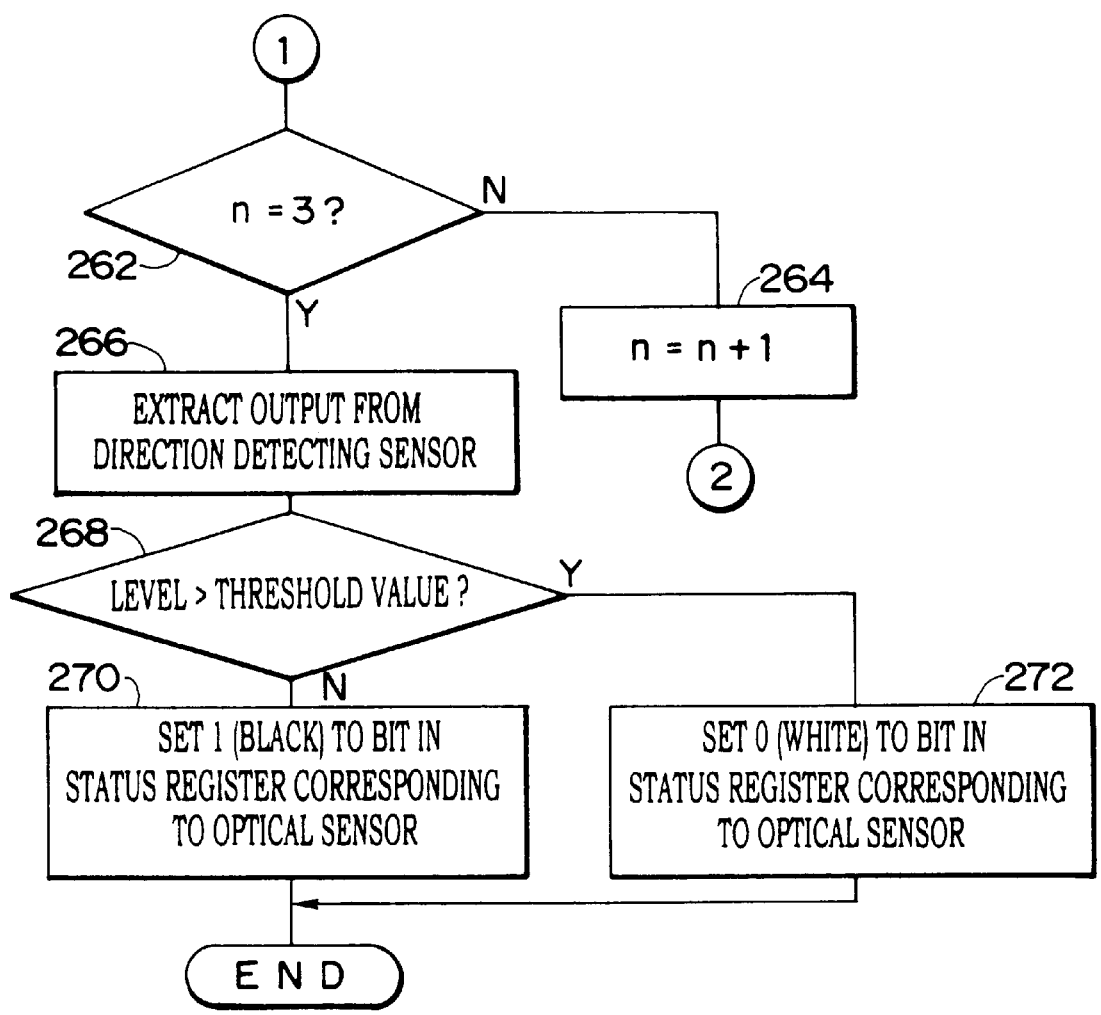

Next, a process of sensing an area, which is performed in the size detection portion 58 relating to the second embodiment, will be explained with reference to flowcharts in FIGS. 14A and 14B. In steps 240 through 246, similarly to the flowcharts in FIGS. 9A and 9B of the first embodiment, after the initialization process is performed by substituting 1 for a sensing region number "n" and the like, the process waits until a video clock signal is raised, the level of a line synchronization signal is "H", and the level of a sensing area signal is "H". When the level of the sensing area signal is "H", the process proceeds to step 248 and waits until the video clock signal is raised.

In a subsequent step 250, one pixel of the image data $V_i$ within the sensing region #n, which has been inputted from the CCD driver 56, is extracted so as to be stored in a memory or the like. At the same time, difference $D_i (= V_i - V_{i-1})$ between the image data $V_i$, which is extracted in this cycle of the video clock signal, and the image data $V_{i-1}$ (the previous pixel data, see FIG. 13), which has been extracted in the previous cycle thereof and stored in the memory or the like, is calculated. When the first image data in the sensing region #n is inputted, only storage of the image is carried out.

In a subsequent step 252, a determination is made as to whether the difference $D_i$ is greater than the threshold value of the sensing region #n which has been inputted from the control portion 54. When the answer to the determination in step 252 is "No", in step 254, a determination is made as to whether the level of the sensing area signal is continuously "H". When the answer to the determination in step 254 is "Yes", the process returns to step 248.

When the difference $D_i$ is not greater than the threshold value (the answer to the determination in step 252 is "No") and the answer to the determination in step 254 is "No", it is determined that the edge of the document does not exist within the sensing region #n. Consequently, in step 256, the value ("0") which indicates that the edge does not exist is set to the bit in the status register corresponding to the sensing area n, and the process proceeds to step 262. When the level of the sensing area signal is "L" and, before the answer to the determination in step 254 is "No", the answer to the determination in step 252 is "Yes", it is determined that the edge of the document exists within the sensing region #n. Accordingly, the value ("1") which indicates that the edge exists is set to the bit in the status register corresponding to the sensing area n. Then, the process proceeds to step 262.

In step 262, a determination is made as to whether the sensing region number is "3", i.e., whether the above-described process is effected to all of the sensing regions #1 through #3. When the answer to the determination in step 262 is "No", in step 264, the value of the sensing region number n is counted up. Thereafter, the process returns to step 242, and the process after step 242 is repeated. Further, when the answer to the determination in step 262 is "Yes", the process proceeds to step 266. In steps 266 through 272, similarly to steps 170 through 176 of the flowchart in FIG. 9B, the signal from the optical sensor 60 is extracted, the level of signal is compared to the threshold value, and on the basis of the results of comparison, the value is set to the bit in the status register corresponding to the optical sensor 60. Thereafter, the process is completed.

At the control portion 54 relating to the second embodiment, sensing is effected when the platen cover 24 starts to close and the platen cover 24 is closed. The data which has been set to the status register is extracted and the results of detection of the sensing regions #1 through #3 are compared. In accordance with the following Table 5, the existence of the edge within each sensing region is determined.

TABLE 5

| State of Cover | Results of Detection of Each Sensing Region | | | |
|---|---|---|---|---|
| Starting to Close | Edge Exists | Edge Exists | Edge Does Not Exist | Edge Does Not Exist |
| Closed | Edge Exists | Edge Does Not Exist | Edge Exists | Edge Does Not Exist |
| Actual Condition | Edge of Image | Edge of Document | Edge of Document | Edge Does Not Exist |
| Results of Determination | Not Edge of Document | Edge of white Document | Edge of Black Document | Not Edge of Document |

In Table 5, "edge of image" means an edge which exists in the image recorded onto the document. When it is determined that "edge of white document (document whose background is white)" exists, if the value of bit in the status register corresponding to the result of detection by the optical sensor 60 is "0", the value is replaced by "document exists", and if the value thereof is "1", the value is replaced by "document does not exist". When it is determined that "edge of black document (document whose background is black)" exists, if the value of bit in the status register corresponding to the result of detection by the optical sensor 60 is "0", the value is replaced by "document does not exist", and if the value thereof is "1", the value is replaced by "document exists". In accordance with the following Table 6, the size and direction of the document are determined.

TABLE 6

| #0 | #1 | #2 | #3 | Size/Direction |
|---|---|---|---|---|
| O | N | N | N | A3/SEF |
| O | Y | N | N | B5/SEF |
| O | N | Y | N | A4/SEF |
| O | N | N | Y | B4/SEF |
| X | N | N | N | A4/LEF |
| X | Y | N | N | B5(?)/SEF |

TABLE 6-continued

| #0 | #1 | #2 | #3 | Size/Direction |
|---|---|---|---|---|
| X | N | Y | N | A5/LEF |
| X | N | N | Y | B5/LEF |

SEF= transverse direction
LEF= longitudinal direction

Wherein, in Table 6, "O" indicates that "document exists", "x" indicates that "document does not exist", "Y" indicates that "edge exists", and "N" indicates that "edge does not exist". Because the combinations other than the results shown in FIG. 6 are logically impossible, other combinations are regarded as an error (detection is impossible).

As described above, in the second embodiment, because the size and direction of the document are determined without moving the sensing area of the CCD line sensor 44, there is no need to provide a plurality of new sensors for detecting the size and direction of the document. Compared to the case in which a pre-scan is effected, the process is completed in a short time. Also, in the above description, since the differences in the image data from the cells within each sensing area are successively calculated for edge detection, it is not necessary to provide a memory with large capacity or the like.

In the above description, the sensing start position serving as the position of sensing region is inputted from the control portion 54 to the size detection portion 58. Accordingly, when the position of the sensing region is changed as the size of document to be detected is changed, the position of the sensing region can be easily changed by changing the sensing start position which is inputted from the control portion 54 to the size detection portion 58.

In the above description, the size of document is determined by using the CCD line sensor 44 which is provided for reading the image of the document. However, the present invention is not limited to this. In an image recording apparatus which records the image of a document onto a recording paper without reading the image of the document and by directly illuminating the light reflected by the document onto a photosensitive drum, the image reading apparatus relating to the present invention may be provided only for the purpose of determining the size of the document.

Further, in the above description, the CCD line sensor 44 is used as a photoelectric transducer. However, the present invention is not limited to this, and well-known various other types of photoelectric transducers such as a MOS image sensor or the like can be used. In the above description, an example is described of a case in which the platen glass 16 is used as a transparent member. However, materials other than glass such as synthetic resin can be used to form a transparent member.

As described hereinbefore, in the present invention, on the basis of the signals which are outputted from the photoelectric transducing elements within a plurality of small regions which correspond to the area across each specific edge of the plurality of documents of different sizes, which are disposed at the substantially fixed positions on the plate-shaped transparent member, the size of the document disposed on the transparent member is determined. Therefore, superior effects are achieved in that the structure is simple and that the size of the document can be detected in a short time.

Further, in the above-described invention, because the positions of the small regions can be changed, in addition to the above-described effects, a superior effect is achieved in that, even if the size of the document to be detected is changed, there is no need to provide new photoelectric transducing elements or to change the positions at which the photoelectric transducing elements are arranged.

In the further aspect of the present invention, besides the above structure, detection means is further provided for detecting the existence of document at the predetermined position on the transparent member, in which when the document is disposed in the first direction, the document exists regardless of the size of the document, and when the document is disposed in the second direction, the document does not exist regardless of the size thereof. On the basis of the signals outputted from the photoelectric transducing elements and results of detection of existence of the document, the size and direction of the document disposed on the transparent member are determined. In addition to the above-described effects, a superior effect is also achieved in that even if the direction of the document disposed on the transparent member is not fixed, the size of the document can be detected.

Still further, the present invention includes a cover. Before and after the transparent member is shielded by the cover, the size of the document is determined on the basis of the signals outputted from the photoelectric transducing elements. Therefore, in addition to the above-described effects, even if the reverse surface of the cover is a low density achromatic color such as white, regardless of the color of the background of the document disposed on the transparent member, a superior effect is achieved in that the size of the document can be accurately detected.

What is claimed is:

1. An image reading apparatus having a plate-shaped transparent member for receiving a document to be optically scanned by a photoelectric transducer having a plurality of photoelectric transducing elements such that the image recorded on the document is read, comprising:

a scanning device movable in a direction orthogonal to said photoelectric transducer, said scanning device irradiating light from a lamp and reflected by reflecting mirrors, to said photoelectric transducer;

a size detector for determining the size of a document disposed on said transparent member, on the basis of pixel signals outputted from the photoelectric transducing elements within a plurality of small regions that extend across specific edges of each of a plurality of documents of different sizes, the photoelectric transducing elements being disposed at substantially fixed positions on said transparent member, wherein said fixed positions of said small regions are changeable; and a control portion connected to said scanning device and said size detector so as to control said scanning device.

2. An image reading apparatus having a plate-shaped transparent member for receiving a document to be optically scanned by a photoelectric transducer having a plurality of photoelectric transducing elements such that the image recorded on the document is read, comprising:

a scanning device movable in a direction orthogonal to said photoelectric transducer, said scanning device irradiating light from a lamp and reflected by reflecting mirrors, to said photoelectric transducer;

a size detector for determining the size of a document disposed on said transparent member, on the basis of pixel signals outputted from the photoelectric transducing elements within a plurality of small regions that extend across specific edges of each of a plurality of documents of different sizes, the photoelectric transducing elements being disposed at substantially fixed positions on said transparent member, wherein at least some of said plurality of small regions include a pair of smaller regions corresponding to a pair of areas spanning specific edges of said document of a predetermined size at a predetermined interval, and the position of the edge of said document and the size of said document are determined on the basis of whether levels of signals outputted from the photoelectric transducing elements within said smaller regions are greater than or equal to a predetermined value; and a control portion connected to said scanning device and said size detector so as to control said scanning device.

3. An image reading apparatus according to claim 2, wherein said size detector compares an average value of the data, which is periodically sampled and extracted from a plurality of pixel data within said small regions, to a predetermined threshold value within each small region, and based on the results of comparison, the size of said document is determined.

4. An image reading apparatus having a plate-shaped transparent member for receiving a document to be optically scanned by a photoelectric transducer having a plurality of photoelectric transducing elements such that the image recorded on the document is read, comprising:

a scanning device movable in a direction orthogonal to said photoelectric transducer, said scanning device irradiating light from a lamp and reflected by reflecting mirrors, to said photoelectric transducer;

a size detector for determining the size of a document disposed on said transparent member, on the basis of pixel signals outputted from the photoelectric transducing elements within a plurality of small regions that extend across specific edges of each of a plurality of documents of different sizes, the photoelectric transducing elements being disposed at substantially fixed positions on said transparent member, wherein at least some of said plurality of small regions include smaller regions which correspond to the area continuously spanning specific edges of said document of a predetermined size, and the position of the edge of said document and the size of said document are determined on the basis of the change in levels of signals outputted from the photoelectric transducing elements within said smaller regions; and a control portion connected to said scanning device and said size detector so as to control said scanning device.

5. An image reading apparatus according to claim 4, wherein the change in the levels of signals outputted from the photoelectric transducing elements within said small regions is detected by continuously comparing pixels within said small regions.

6. An image reading apparatus having a plate-shaped transparent member for receiving a document to be optically scanned by a photoelectric transducer having a plurality of photoelectric transducing elements such that the image recorded on the document is read, comprising:

a scanning device movable in a direction orthogonal to said photoelectric transducer, said scanning device irradiating light from a lamp and reflected by reflecting mirrors, to said photoelectric transducer;

a size detector for determining the size of a document disposed on said transparent member, on the basis of pixel signals outputted from the photoelectric transducing elements within a plurality of small regions that extend across specific edges of each of a plurality of documents of different sizes, the photoelectric transducing elements being disposed at substantially fixed positions on said transparent member, a control portion connected to said scanning device and said size detector so as to control said scanning device; and a cover movable between a position at which said transparent member is shielded and a position at which said transparent member is exposed, wherein before and after said transparent member is shielded by said cover, the size of said document is determined on the basis of the signals outputted from the photoelectric transducing elements.

7. An image reading apparatus according to claim 6, wherein said control portion is further connected to an angle sensor, which contacts said cover as said cover moves in a direction in which said cover is closed angularly, and to a cover closing detection means, which is mounted to a longitudinal direction distal end portion of said cover and detects a state in which said cover is completely closed, and due to the ON/OFF combinations of said angle sensor and said cover closing detection means, the existence of said document and the size of said document are determined.

8. An image reading apparatus in which a document, which is disposed on a plate-shaped transparent member, is optically scanned by a photoelectric transducer having a plurality of photoelectric transducing elements such that the image which is recorded onto said document is read, comprising:

a size detector which determines the size of said document which is disposed on said transparent member, on the basis of pixel signals outputted from the photoelectric transducing elements within a plurality of small regions which correspond to the area across each specific edge of a plurality of documents of different sizes which are disposed at substantially fixed positions on said transparent member; and detection means which detects the existence of said document at a predetermined position on said transparent member wherein when said document is disposed on said transparent member in a first direction, said document exists regardless of the size of said document, and when said document is disposed on said transparent member in a second direction which is different from said first position, said document does not exist regardless of the size of said document, wherein on the basis of the signals outputted from the photoelectric transducing elements within said plurality of small regions and the results of detection of existence of said document effected by said detection means, the size and direction of said document disposed on said transparent member are determined.

9. An image reading apparatus according to claim 8, wherein said detection means is a optical sensor disposed beneath said transparent member.

10. An image reading apparatus according to claim 8, wherein the signals outputted from said detection means are compared to a predetermined threshold value, and on the basis of the results of comparison, the existence of the document is examined.

* * * * *